United States Patent
Kamiya

(10) Patent No.: US 11,104,023 B2
(45) Date of Patent: Aug. 31, 2021

(54) CUTTING TOOL

(71) Applicant: MAKITA CORPORATION, Anjo (JP)

(72) Inventor: Takeshi Kamiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/474,762

(22) PCT Filed: Dec. 12, 2017

(86) PCT No.: PCT/JP2017/044596
§ 371 (c)(1),
(2) Date: Jun. 28, 2019

(87) PCT Pub. No.: WO2018/139085
PCT Pub. Date: Aug. 2, 2018

(65) Prior Publication Data
US 2019/0344461 A1    Nov. 14, 2019

(30) Foreign Application Priority Data

Jan. 27, 2017    (JP) .............................. JP2017-013454

(51) Int. Cl.
*B26B 25/00*  (2006.01)
*B23D 45/16*  (2006.01)
(Continued)

(52) U.S. Cl.
CPC .............. *B26B 25/00* (2013.01); *B23D 45/16* (2013.01); *B23D 47/12* (2013.01);
(Continued)

(58) Field of Classification Search
CPC ....... B23D 45/16; B26B 25/00; B26B 25/002; B26B 29/04; B26B 15/00; B27B 9/00;
(Continued)

(56) References Cited

U.S. PATENT DOCUMENTS 249,734 A * 11/1881 Arnold ...................... B27B 5/10
83/471
2,226,241 A * 12/1940 Gray ...................... B23D 29/00
30/228
(Continued)

FOREIGN PATENT DOCUMENTS

CN    101522352 A    9/2009
CN    102335785 A    2/2012
(Continued)

OTHER PUBLICATIONS

Office Action and Search Report from the Chinese Patent Office dispatched Aug. 3, 2020 in related application CN 201780083443, and machine translation thereof.
(Continued)

*Primary Examiner* — Jason Daniel Prone
*Assistant Examiner* — Samuel A Davies
(74) *Attorney, Agent, or Firm* — J-Tek Law PLLC; Jeffrey D Tekanic; Scott T. Wakeman

(57) ABSTRACT

A cutting tool includes a rotary blade driven by a motor, a fixed blade disposed opposing the rotary blade, a housing holding the motor, and a battery mount part on a rear portion of the housing. The battery mount part has a guide groove that slidably receives a rail of a power tool battery pack. A blade cover is disposed partially around the rotary blade, and a portion or all of the blade cover has a shape in which the farther forward it goes the more it goes toward the side that has the fixed blade, viewed from the rotary blade. A base holds the fixed blade, and a portion or all of the base has a shape in which the farther forward it goes the more it goes toward the side that has the fixed blade, viewed from the rotary blade.

22 Claims, 20 Drawing Sheets

(51) Int. Cl.
  *B23D 47/12* (2006.01)
  *B25F 5/02* (2006.01)
  *B23Q 17/22* (2006.01)
  *B27B 9/02* (2006.01)
(52) U.S. Cl.
  CPC ............ *B23Q 17/2241* (2013.01); *B25F 5/02* (2013.01); *B27B 9/02* (2013.01)
(58) Field of Classification Search
  CPC ...... B26F 1/3826; B26F 2210/14; B26D 1/20; B26D 1/205; Y10T 83/7863
  USPC ........... 83/802, 522.15, 522.16; 30/240, 263, 30/264, 307
  See application file for complete search history.

(56) References Cited

U.S. PATENT DOCUMENTS

| | | | | |
|---|---|---|---|---|
| 2,701,911 A * | 2/1955 | Maescher | ............ | B26F 1/3826 30/240 |
| 3,262,201 A * | 7/1966 | Docken | ................ | B23D 29/005 30/240 |
| 3,421,218 A * | 1/1969 | Thompson | .............. | B26B 15/00 30/228 |
| 3,798,767 A * | 3/1974 | Rizer | .................... | B26F 1/3826 30/206 |
| 4,275,500 A | 6/1981 | Speer, Jr. et al. | | |
| 6,161,293 A | 12/2000 | Watson | | |
| 6,352,127 B1 * | 3/2002 | Yorde | .................... | B23Q 5/045 173/216 |
| 8,069,572 B2 | 12/2011 | Dreher | | |
| 8,414,595 B2 * | 4/2013 | Baker | ...................... | B26D 1/14 606/105.5 |
| 9,168,188 B2 * | 10/2015 | Zwirkoski | ............... | B26B 25/00 |
| 2010/0116112 A1 * | 5/2010 | Fukuoka | ................... | B27B 9/04 83/471 |
| 2010/0146797 A1 * | 6/2010 | Dreher | .................... | B26B 29/02 30/228 |
| 2012/0017448 A1 | 1/2012 | Dreher | | |
| 2013/0081285 A1 * | 4/2013 | Moreno | ................. | B23D 45/16 30/377 |
| 2015/0132988 A1 | 5/2015 | Burger et al. | | |
| 2015/0328796 A1 * | 11/2015 | Okouchi | ............. | B23D 59/006 30/377 |

FOREIGN PATENT DOCUMENTS

| | | |
|---|---|---|
| JP | S42008947 Y1 | 5/1967 |
| JP | S4866177 U | 8/1973 |
| JP | S55172165 U | 12/1980 |
| JP | S58154095 U | 10/1983 |
| JP | 2015519213 A | 7/2015 |
| JP | 2016087724 A | 5/2016 |
| JP | 2017013184 A | 1/2017 |

OTHER PUBLICATIONS

English translation of the International Search Report dated Mar. 13, 2018 for parent application No. PCT/JP2017/044596.

English translation of the Written Opinion of the International Searching Authority for parent application No. PCT/JP2017/044596.

Office Action from the Chinese Patent Office dispatched Mar. 23, 2021 in related application CN 201780083443.3, and translation thereof.

Office Action from the Japanese Patent Office dispatched Apr. 6, 2021 in related application JP 2017-013454, and machine translation thereof.

Office Action from the Japanese Patent Office dispatched Sep. 23, 2020 in related application JP 2017-013454, and machine translation thereof.

* cited by examiner

CUTTING TOOL

The present application is the US national stage of International application serial no. PCT/JP2017/044596 filed on Dec. 12, 2017, which claims priority to Japanese patent application serial number 2017-013454 filed on Jan. 27, 2017.

TECHNICAL FIELD

The present invention generally relates to a cutting tool that cuts a workpiece using a driven blade and a fixed blade.

BACKGROUND ART

As shown in U.S. Pat. No. 8,069,572, a handheld electric cutter is known in which a cutting disk, the outer shape of which has a polygonal shape, is rotated by an electric motor.

An opposing blade is disposed on a lower side of the cutting disk, and a base, which is oriented in the same direction as a grip in top view, is disposed downward of the opposing blade.

A rechargeable battery for the electric motor is housed inside a housing of the handheld electric cutter.

SUMMARY OF THE INVENTION

However, because the rechargeable battery is built into the housing of the above-described handheld electric cutter, swapping of the batteries is complicated.

Thus, one non-limiting object of the present teachings is to disclose a cutting tool in which handling of the battery is easier.

In addition, because the base of the above-described handheld electric cutter extends in the same direction as the grip in top view, spaces between the cutting disk and the opposing blade are created comparatively easily, and if such spaces are created, then it becomes difficult for the user to cut a workpiece in a desired direction, thereby impairing operation of the handheld electric cutter.

Therefore, another non-limiting object of the present teachings is to disclose a cutting tool in which cutting operations are easier to perform.

In one aspect of the present teachings, a cutting tool (multi-cutter) may comprise: a motor; a rotary blade driven by the motor; a fixed blade disposed opposing the rotary blade; a housing in which the motor is held; and a battery mount part, which is formed on the housing and on which a battery for a power tool is mountable. The battery mount part may have a guide groove that guides the battery.

The battery mount part may be disposed on a rear end part of the housing and the guide groove may extend in one of an up down direction, a front rear direction, or a left right direction.

The cutting tool may further comprise a battery, which is mountable on the battery mount part. The battery preferably has a rail, which enters the guide groove.

The cutting tool may further comprise: a base that comprises a fixed blade retaining part, which holds the fixed blade, and a base main body part, which holds the fixed blade retaining part. The rotary blade may be driven about a rotary shaft, which is oriented in the left right direction; the fixed blade may be disposed adjacent to a left surface or a right surface of the rotary blade; and the base main body part may overlap, in the left right direction, at least one of the fixed blade and the fixed blade retaining part. For example, the base main body part may overlap the fixed blade, in particular.

The cutting tool may further comprise a blade cover disposed outward of the rotary blade. The rotary blade may be driven about a rotary shaft, which is oriented in the left right direction; the fixed blade may be disposed adjacent to a left surface or a right surface of the rotary blade; and a portion or all of the blade cover may have a shape in which the farther forward it goes, the more it goes toward the side having the fixed blade, viewed from the rotary blade.

The cutting tool may further comprise a base, which holds the fixed blade. The rotary blade may be driven about a rotary shaft, which is oriented in a left right direction; the fixed blade may be disposed adjacent to a left surface or a right surface of the rotary blade; and a portion or all of the base may have a shape in which the farther forward it goes, the more it goes toward the side having the fixed blade, viewed from the rotary blade.

The cutting tool may further comprise a gear assembly, which is connected to the motor and held by the housing; wherein the gear assembly comprises a gear case.

In the cutting tool, the housing may be halved and the gear case may include divided surfaces in a direction that crosses divided surfaces of the housing.

In additional embodiments of the present teachings, a cutting tool (multi-cutter) may comprise: a motor; a rotary blade driven by the motor about a rotary shaft, which is oriented in the left right direction; a fixed blade disposed adjacent to a left surface or a right surface of the rotary blade; and a blade cover disposed outward of the rotary blade. A portion or all of the blade cover may have a shape in which the farther forward it goes the more it goes toward the side that has the fixed blade, viewed from the rotary blade.

In the cutting tool, the rotary blade may be parallel to a motor shaft of the motor.

In the cutting tool, a portion of the blade cover may be a mark, in which at least one of a protrusion or a change of color has been implemented with respect to other portions of the blade cover.

In additional embodiments of the present teachings, a cutting tool (multi-cutter) may comprise: a motor; a rotary blade driven by the motor about a rotary shaft, which is oriented in the left right direction; a fixed blade disposed adjacent to a left surface or a right surface of the rotary blade; and a base, which holds the fixed blade. A portion or all of the base may have a shape in which the farther forward it goes the more it goes toward the side that has the fixed blade, viewed from the rotary blade.

In the cutting tool, the rotary blade may be parallel to a motor shaft of the motor.

In the cutting tool, a portion of the base cover may be a mark, in which at least one of a protrusion or a change of color has been implemented with respect to other portions.

Additional objects, embodiments and advantages will become apparent upon reading the following detailed description and appended claims in view of the drawings.

DETAILED DESCRIPTION OF THE EMBODIMENTS

Figure 1:
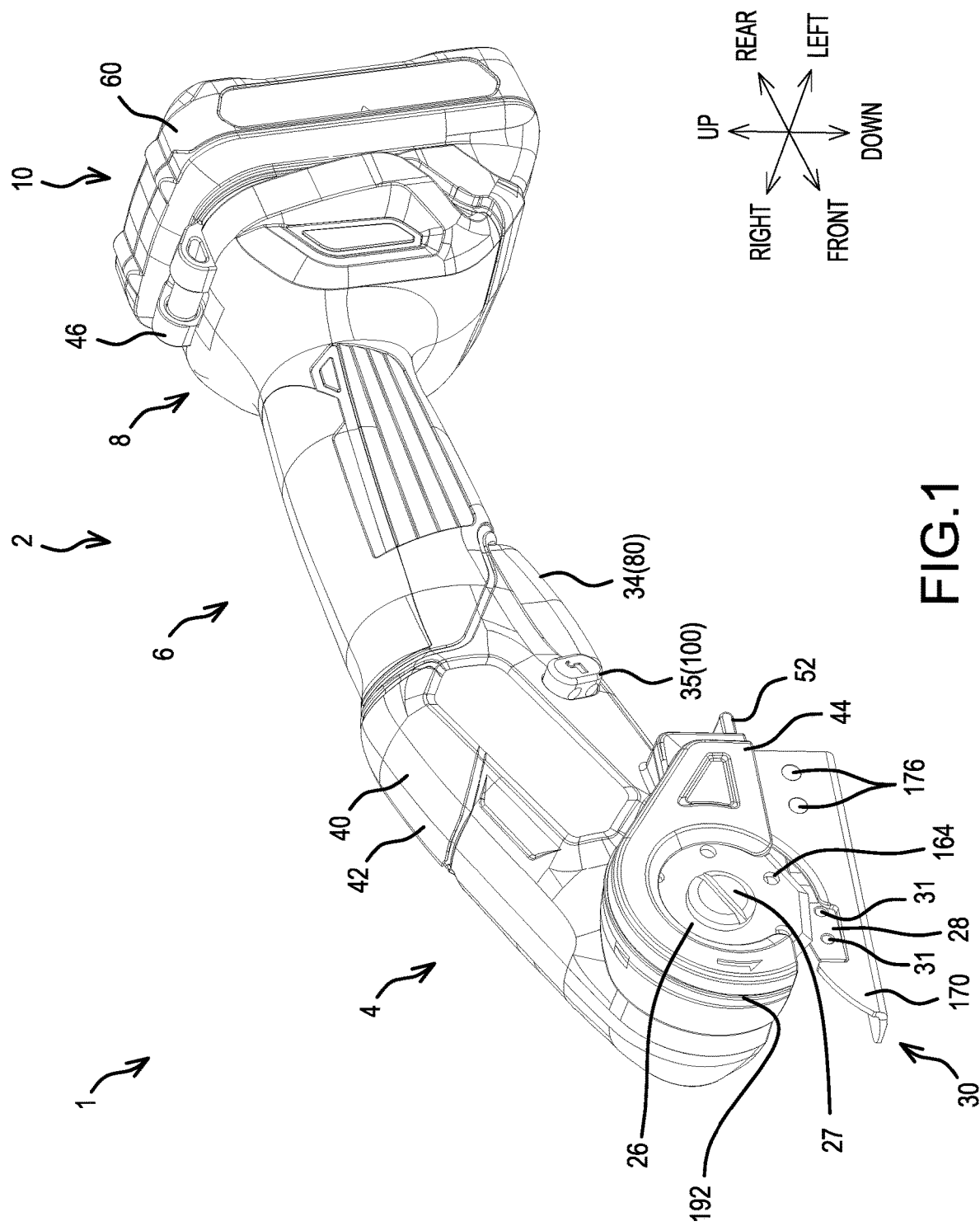
FIG. 1 is an oblique view of a multi-cutter according to a first embodiment of the present disclosure.

Embodiments and modified examples thereof of the present teachings are explained below, with reference to the drawings as appropriate.

Front, rear, up, down, left, and right in the embodiments and modified examples are prescribed for the sake of convenience of the explanation and may change according to the work circumstances, the state of a structure that moves, or the like.

It is noted that the present invention is not limited to the embodiments and modified examples below.

First Embodiment

Referring first to FIGS. 1-12, the multi-cutter 1 of the first embodiment includes a housing 2 that forms an outer wall of the multi-cutter 1.

The multi-cutter 1 comprises: a main body part 4, which has a circular columnar shape, extends in a diagonal direction with the front being lower, and extends in the front rear direction in top view; a handle part 6, which has a circular columnar shape, is formed such that it protrudes rearward from a rear end part of the main body part 4, extends in the front rear direction (in a diagonal direction with the front being lower, nearly completely in the front rear direction), and extends in the front rear direction in top view; a battery mount part 8, which protrudes rearward from the rear end part of the handle part 6 such that it extends up, down, left, and right; and a battery (battery pack, battery cartridge) 10, which is capable of being mounted on and dismounted from the battery mount part 8. It is noted that the battery 10 does not have to be included in the structural elements of the multi-cutter 1.

The direction of the central axis of the main body part 4 and the direction of the central axis of the handle part 6 intersect at an angle (an obtuse angle) in side view (viewed from the left or viewed from the right). It is noted that, here, although the perfect front rear direction corresponds to those central axis directions for the situations in which the main body part 4, the handle part 6, or the like are viewed from above, and the up down direction is the vertical direction of a lower surface of a base 30 (the direction of a rear side of the base 30), which is discussed later, they may be other directions.

In order from the rear side, a motor 11 and a gear assembly 12, which is a motive power transmission mechanism, are inserted (arranged) in the main body part 4 of the multi-cutter 1. It is noted that the supply (arrangement) of the various housings, cases, and the various members in portions thereof appropriately includes, in addition to situations in which members fit completely in a housing, a case, or a portion thereof, situations in which part of a member fits in a housing, a case, or a portion thereof and a remaining part protrudes or is exposed from the housing, the case, or a portion thereof.

Figure 13:
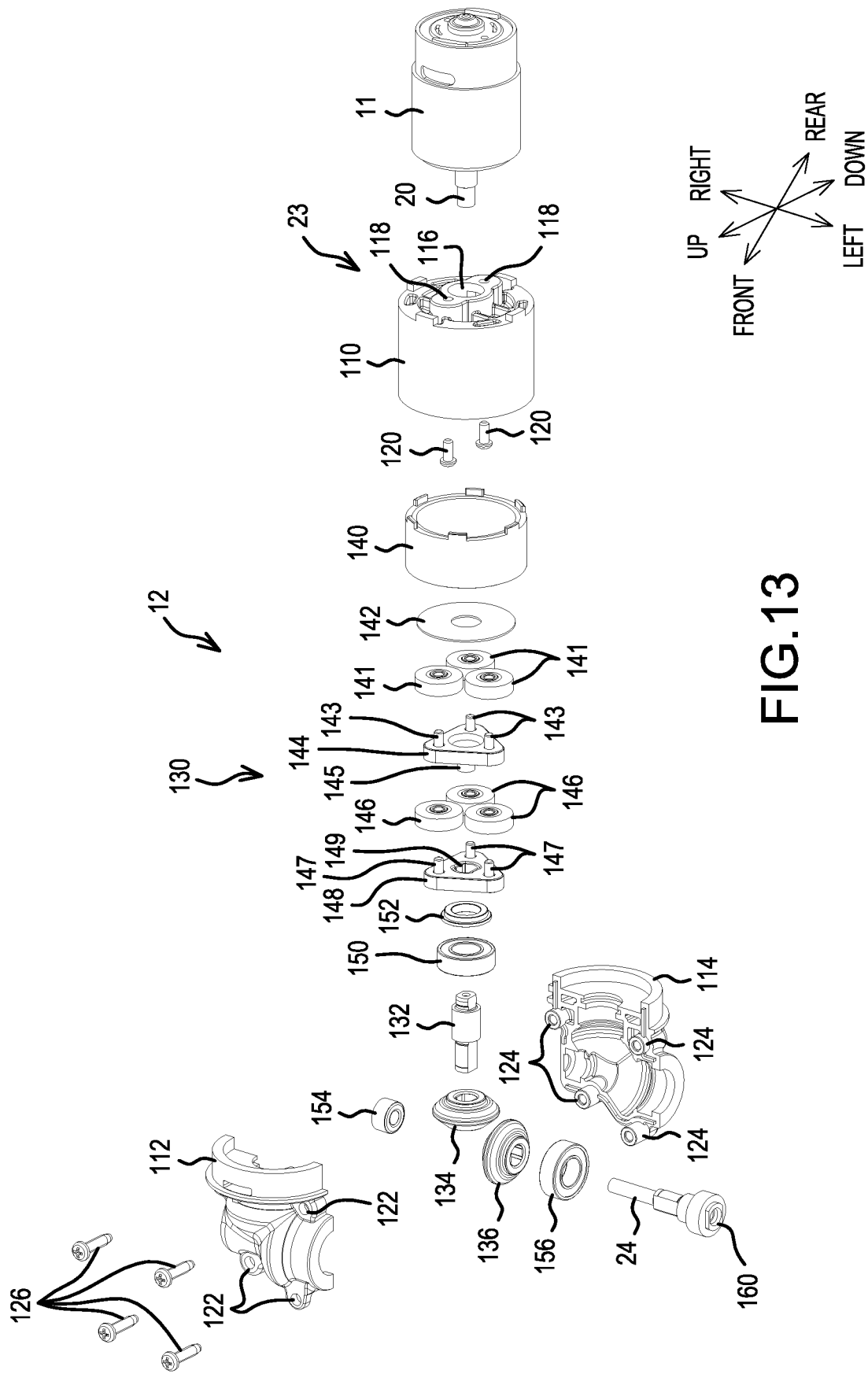
FIG. 13 is an exploded oblique view of a motor and a gear assembly of FIG. 12.
Figure 14:
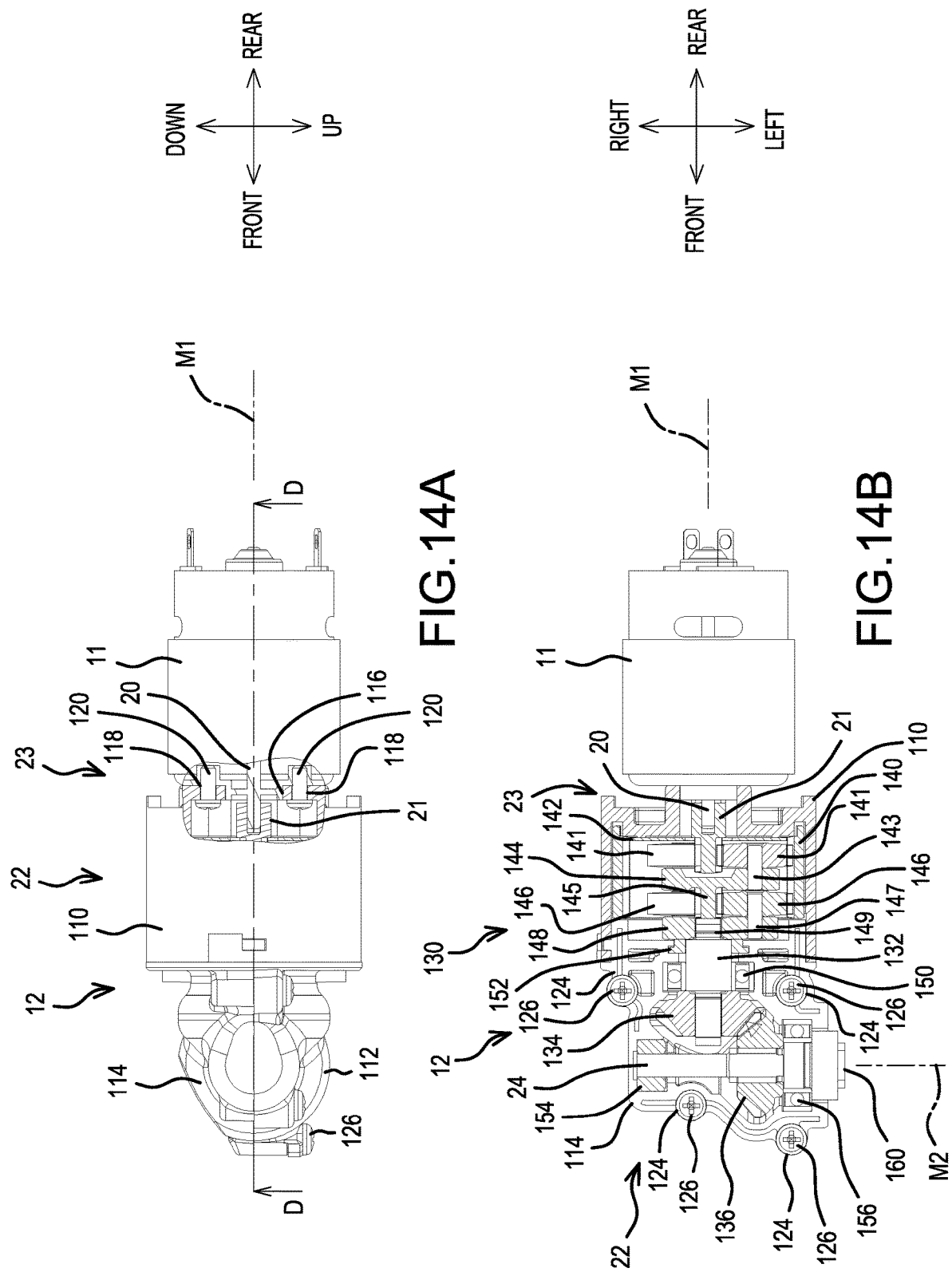
FIG. 14A is a right view (a partial, center, longitudinal cross sectional view) of the motor and the gear assembly of FIG. 12.
FIG. 14B is a cross sectional view taken along line D-D (with the motor not in cross section) in FIG. 14A.
Figure 15:
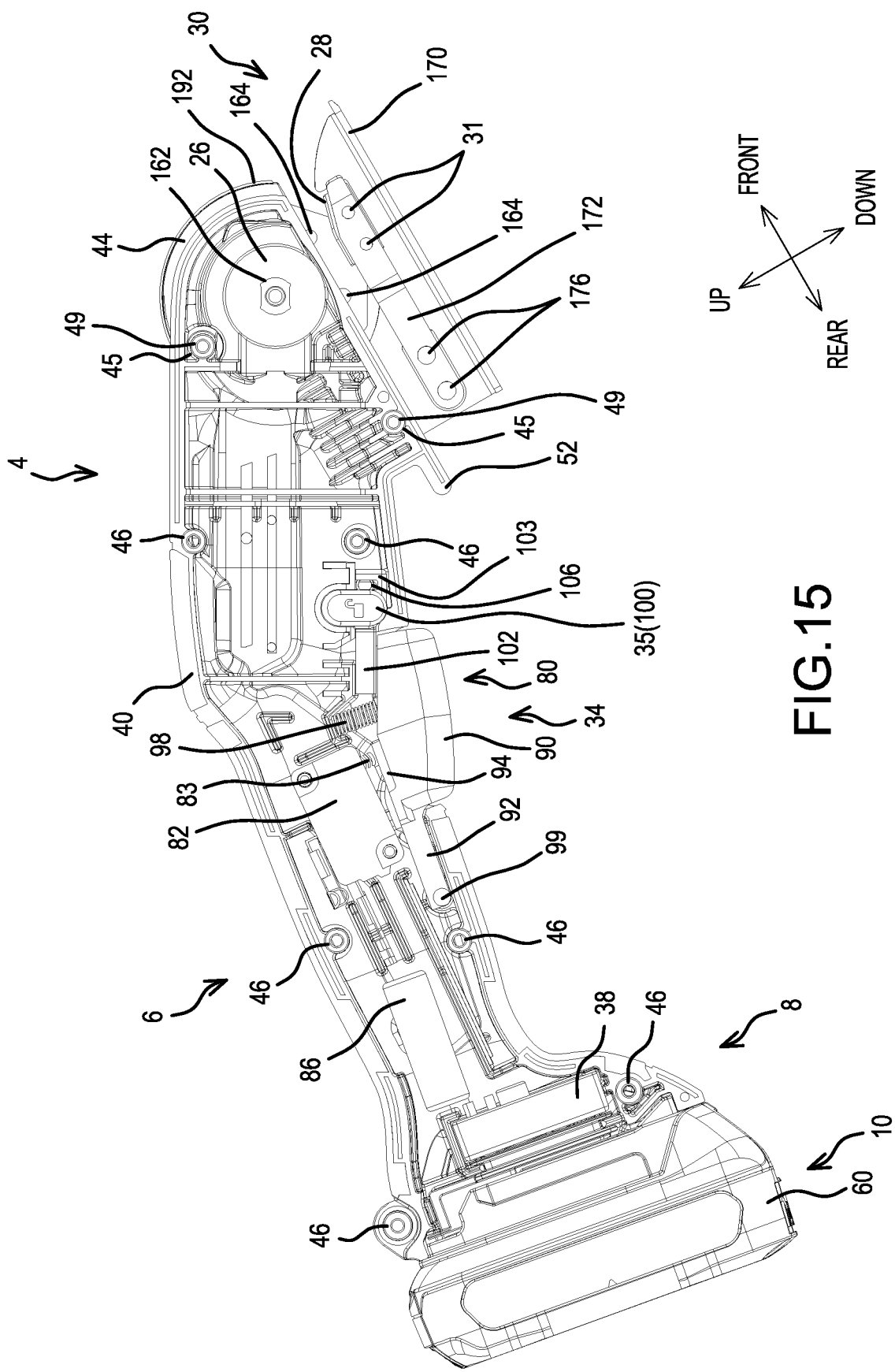
FIG. 15 is a right view, with the cover open, related to the state in which the motor and the gear assembly are omitted from FIG. 11.

Referring now to FIGS. 13-15, the motor 11 comprises a motor shaft 20, which is rotatably driven by the electric power of the battery 10. A pinion 21 is fixed to a front end portion of the motor shaft 20.

The gear assembly 12 comprises: a gear case 22, which is made of resin and constitutes the outer wall of the gear assembly 12; a motor connection part 23, which is formed in the rear end part of the gear case 22 such that it receives the motor shaft 20 (the pinion 21); and an output shaft 24, which intersects the direction of the motor shaft 20 at an angle (90°) and is partially exposed on a left side; and is modularized.

The motor 11 is the motive power source of the multi-cutter 1, and the rotation of the motor 11 is transmitted to the gear assembly 12 and, after the speed of the rotation is reduced or the direction of the rotation is changed, is transmitted to the output shaft 24.

The output shaft 24 is a member that receives a rotational force and is rotatable about its axis; a rotary blade 26, which serves as a tool accessory, is fixed to a tip portion (a left end portion) of the output shaft 24 by a screw 27.

A fixed blade 28, which opposes the rotary blade 26, is disposed on a lower side of the rotary blade 26. The fixed blade 28 is fixed to the base 30 by a plurality of rivets 31.

Referring now to FIG. 1, the handle part 6 is the portion that is grasped by the user. Thus, the multi-cutter 1, which is capable of being grasped by one hand (a handheld cutting tool), is, in conjunction with the use of the battery 10, a portable cutting tool.

A main switch 34, which turns the drive of the motor 11 ON and OFF, is disposed on a portion extending from a front lower part of the handle part 6 to a rear lower part of the main body part 4.

In addition, a lock OFF lever 35, which extends from a rear lower part of the main body part 4 to a front lower part of the handle part 6 and locks so that the main switch 34 does not turn ON, is disposed at a location adjacent to (on the front side of) the main switch 34.

Furthermore, a terminal 36, which is electrically connectable to the battery 10, and a controller 38, which controls the motor 11, are disposed in the battery mount part 8.

The housing 2 comprises: a left housing 40 and a right housing 42, which are made of resin and each have a half housing shape that extends from the main body part 4 through the handle part 6 to the battery mount part 8; and a blade cover 44, which is disposed outward of a front end part of the rotary blade 26. It is noted that at least one of the gear case 22, which is described above, a battery case 60, which is described below, and the like may be included in the structural elements of the housing 2. In addition, the left housing 40 and the right housing 42 as well as the gear case 22 may be made of a metal, such as aluminum, and may be a combination of resin and metal.

Figure 9:
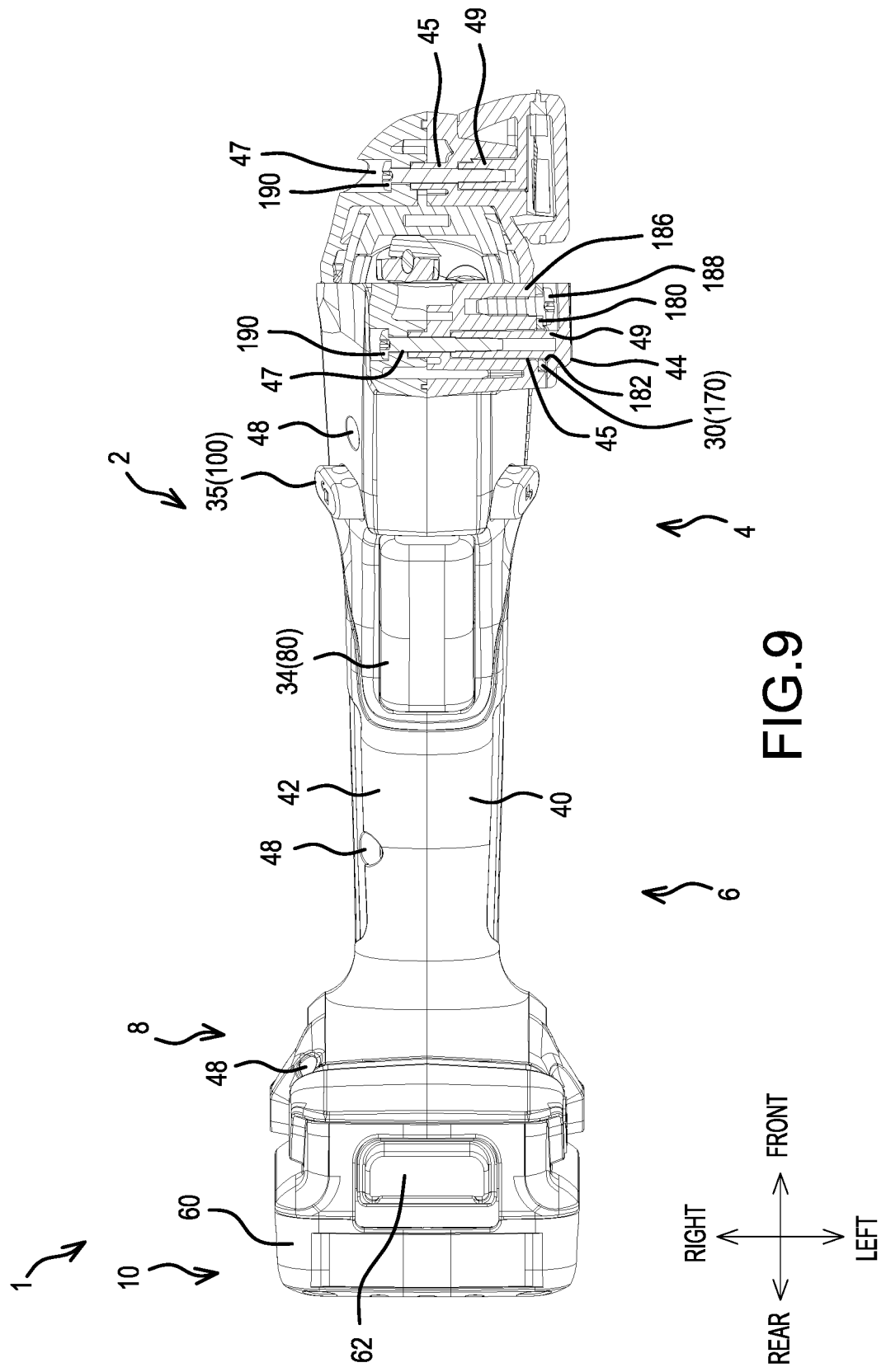
FIG. 9 is a cross sectional view taken along line B-B in FIG. 4.
Figure 11:
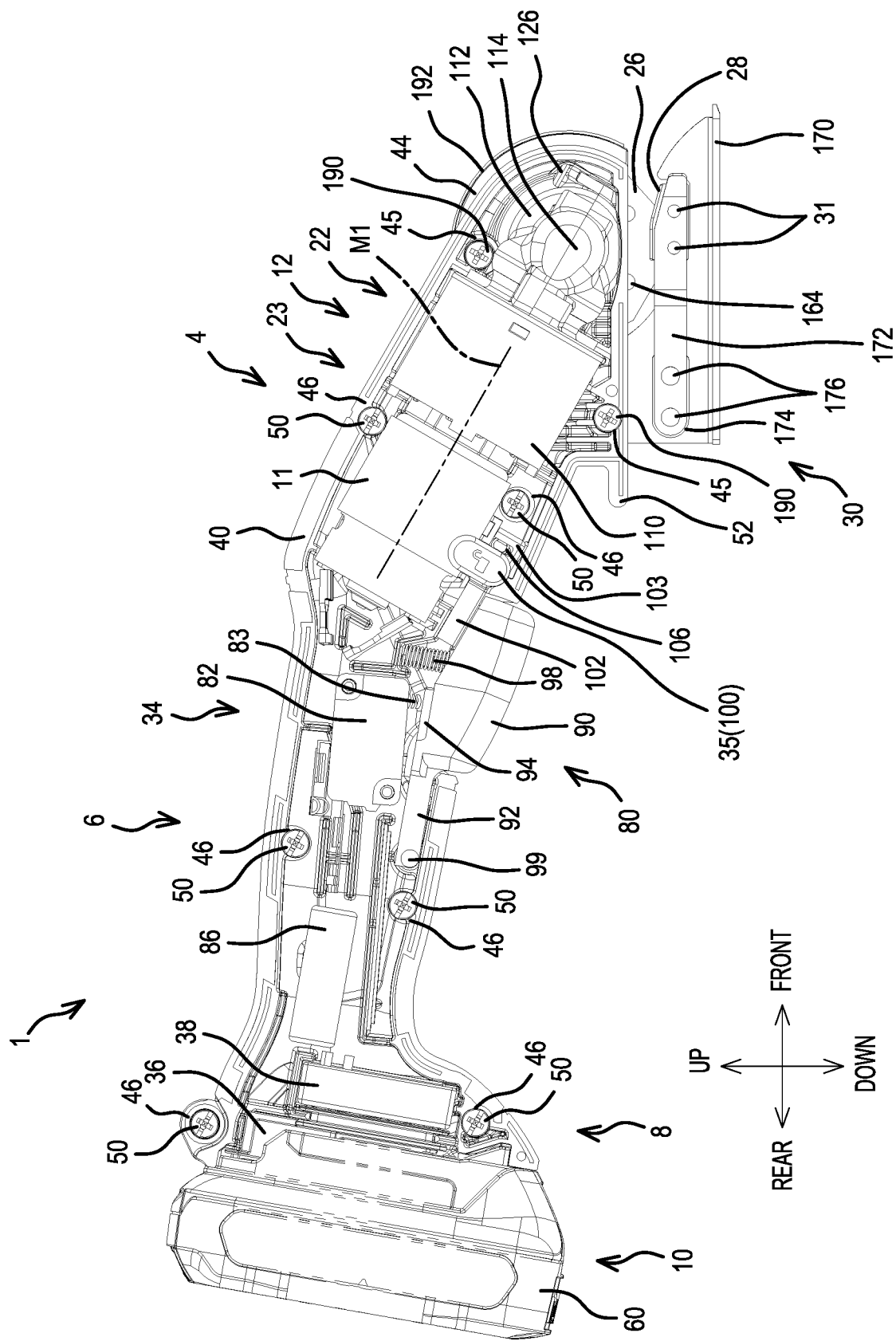
FIG. 11 is a right view of FIG. 1, with the cover open.
Figure 12:
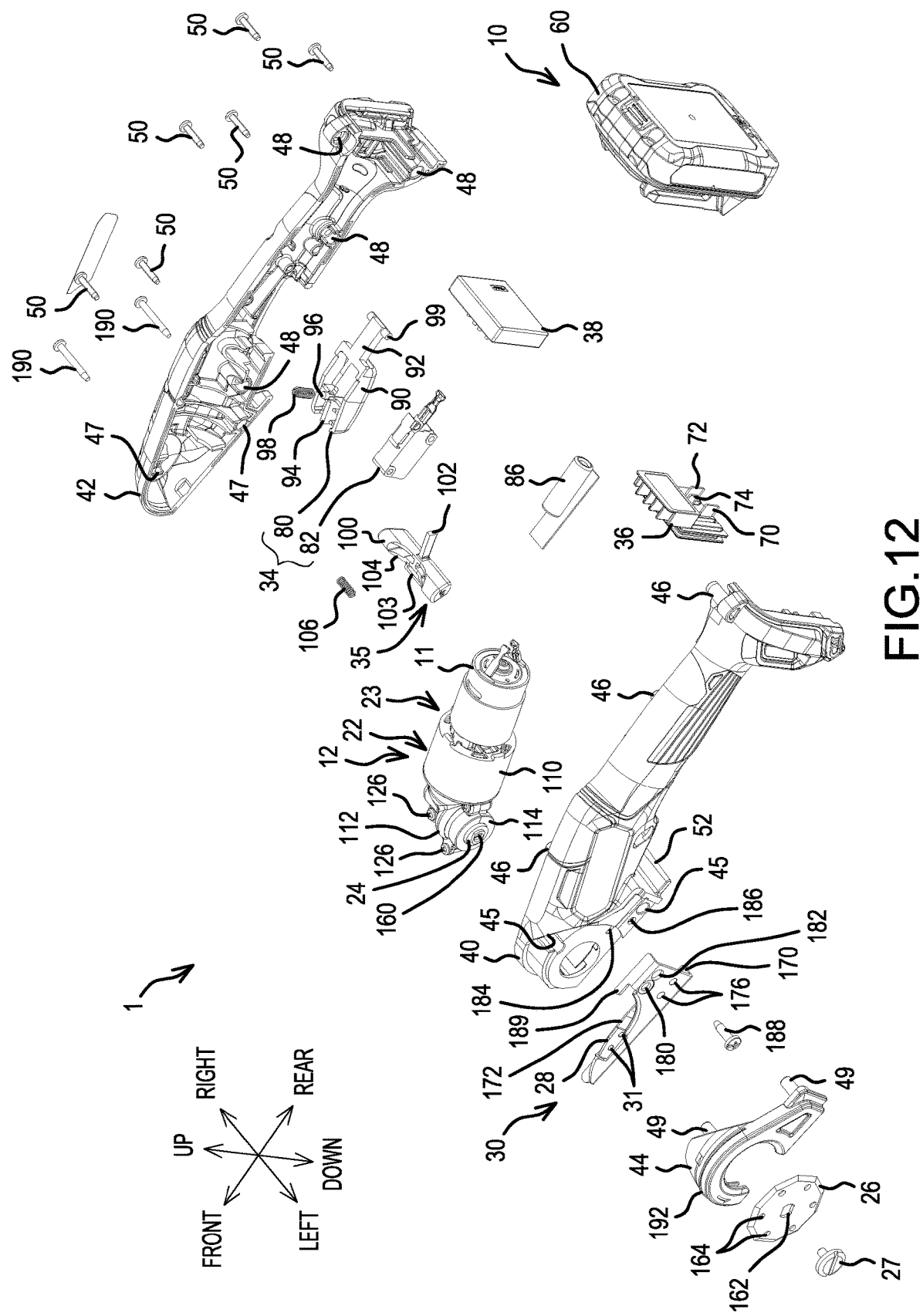
FIG. 12 is an exploded oblique view of FIG. 1.

Referring now to FIGS. 9, 11 and 12, the left housing 40 has a plurality of (two) holes 45 in a front part and a plurality of screw boss parts 46 in a center part, a rear part, etc. Each hole 45 is formed such that its inner diameter narrows in one step from a left part to a right part. A right side of each hole 45 protrudes in a tubular shape rightward from a right surface of the left housing 40.

The right housing 42 has screw holes 47, which correspond to the holes 45, and screw holes 48, which correspond to the screw boss parts 46. Each screw hole 47 is formed such that its inner diameter narrows in one step at a center part and such that it has widened-diameter parts on both the left and the right sides, in which the left widened-diameter part receives the tubular shaped protruding part of the corresponding hole 45.

The blade cover 44 comprises screw boss parts 49, which correspond to the holes 45.

The left housing 40 and the right housing 42 are joined by screws 50, which are each inserted into a pair composed of one screw boss part 46 and one screw hole 48.

A guide projection 52, which protrudes rearward and guides a workpiece, is formed at a part that is rearward of the blade cover 44, the base 30, etc. and is a portion of the left housing 40 and the right housing 42 at the center lower part of the main body part 4. A front part lower surface, which includes a lower surface of the blade cover 44, the guide projection 52 of the main body part 4, and the like, is formed such that it extends to the front, rear, left, and right and is parallel to the lower surface of the base 30.

Figure 18A:
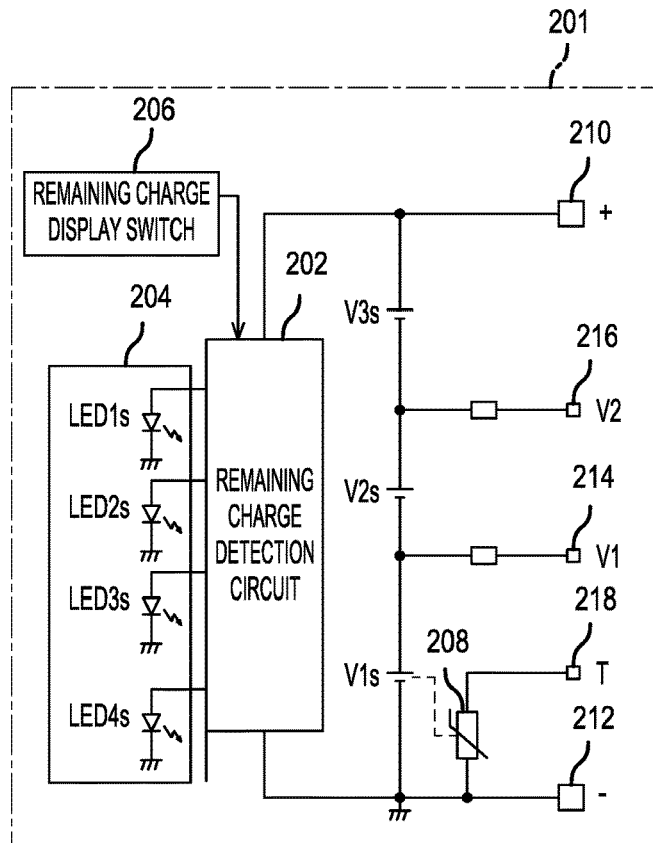
FIGS. 18A and B are block diagrams of control circuits of batteries according to the first embodiment and a second embodiment, respectively, of the present teachings.

The battery 10 may be a 10.8 V (Volt) lithium ion battery (battery pack, battery cartridge) that contains three cells, which are not shown other than in FIG. 18A, inside the battery case 60, which is made of resin. The cells have a circular columnar shape that is elongated in the axial direction, are oriented in the left right direction, and are connected in series. It is noted that the number, the connection configuration, and the like of the cells can be variously modified; for example, by arranging a total of six cells appropriately connected in parallel (two sets connected in parallel, each set having three cells connected in series), capacity may be further increased, and by increasing or decreasing the number of cells in the series connection, the voltage may be set to 14.4 V, 18 V, 36 V, 58 V, etc.

The battery 10 is for a power tool and is used by being mounted on a rechargeable power tool such as, for example, an impact driver, an impact wrench, a screwdriver, a hammer drill, a reciprocating saw, and a circular saw. It is noted that the battery 10 may be used in a gardening tool or the like, such as a cleaner, a blower, or a gardening trimmer.

Figure 2A:
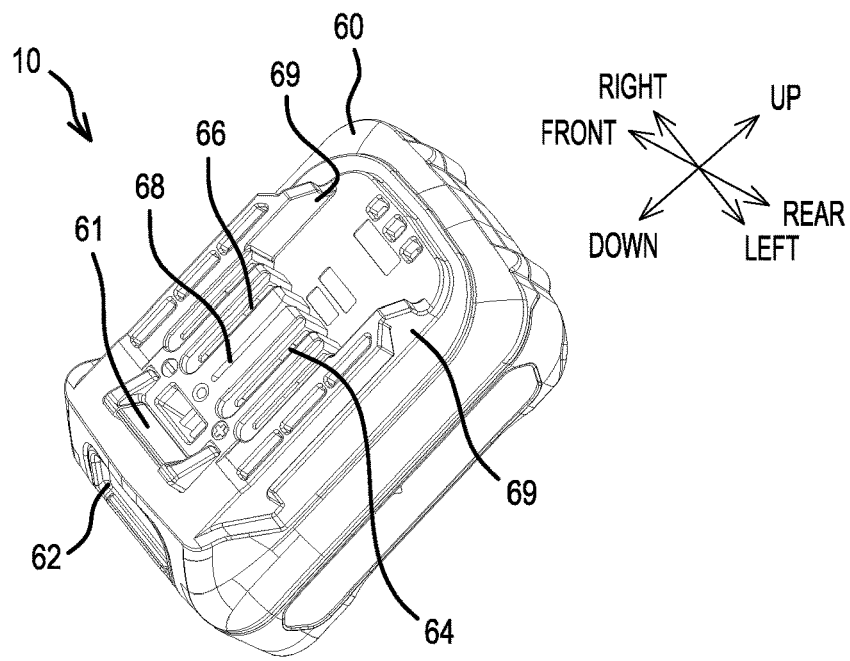
FIG. 2A is an oblique view of a battery of FIG. 1.

Referring now to FIG. 2A, the battery 10 comprises a battery tab 61, which is urged forward by an elastic member that is not shown, and protrudes from a front surface; and a battery lever 62, which is capable of moving rearward against the biasing force and is disposed such that it is exposed at the lower surface. In addition, the battery 10 comprises, on its front surface and extending in the up down direction, a plus terminal slit 64, a minus terminal slit 66, and a communication terminal slit 68. Furthermore, the front surface of the battery 10 has rails 69, which are disposed on the left and right, extend in the up down direction, and protrude forward.

Figure 2B:
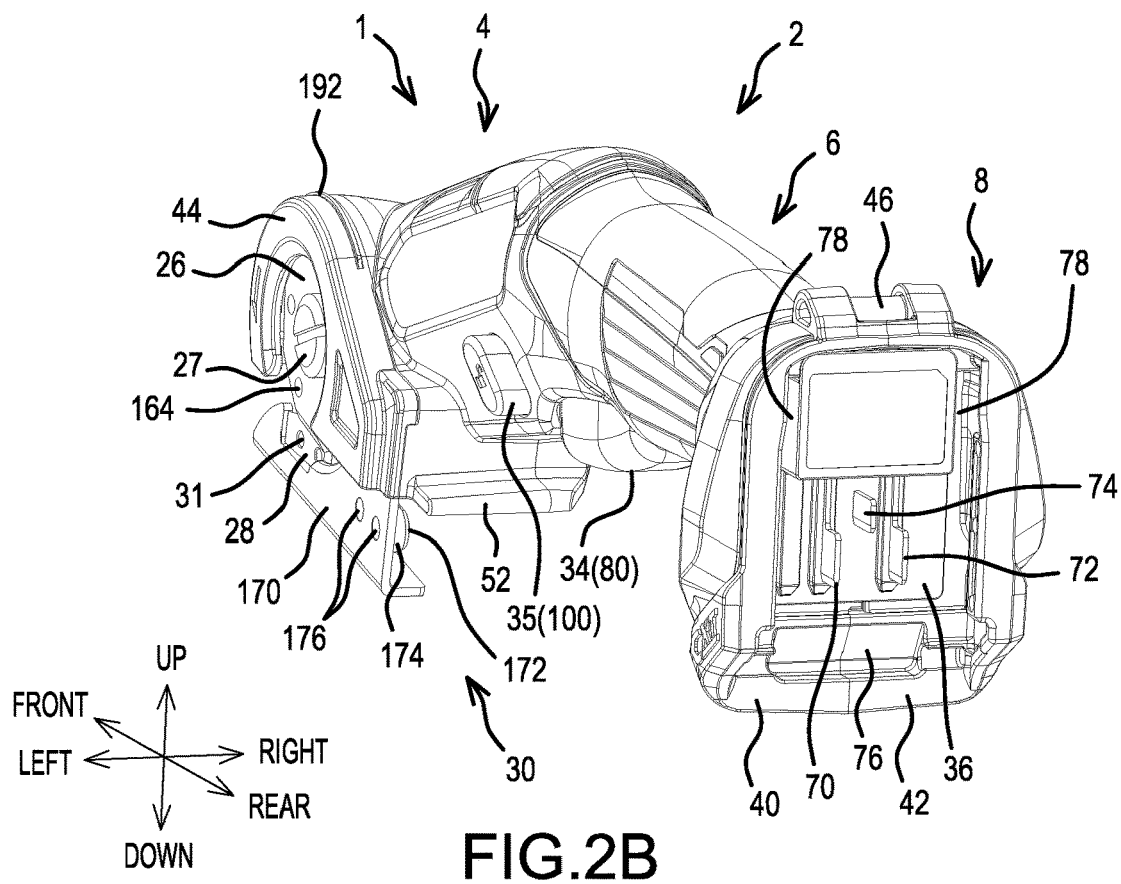
FIG. 2B is an oblique view, viewed from the rear, related to a battery removed state.

Referring now to FIG. 2B, the terminal 36 of the battery mount part 8 is a plate shaped member that extends up, down, left, and right; and has a plus terminal 70, a minus terminal 72, and a communication terminal 74 (protruding parts), each of which has a plate shape. The terminal 36 is disposed such that its rear surface is exposed, is formed such that it protrudes rearward from that rear surface, and extends in the up down direction.

The battery 10 is mounted by being slid upward (sliding mount) from below the battery mount part 8. When being mounted, the plus terminal 70, the minus terminal 72, and the communication terminal 74 of the battery mount part 8 enter, in order, the plus terminal slit 64, the minus terminal slit 66, and the communication terminal slit 68 on the front surface of the battery 10. In addition, the battery tab 61 enters a hollow part 76, which is formed, such that it is recessed forward, in the rear surface of the housing 2 (the left housing 40 and the right housing 42), which is the battery mount part 8.

When the battery 10 is to be removed, the user, by moving the battery lever 62 rearward, sets the state in which, by reducing the amount of protrusion of the battery tab 61, the battery tab 61 is separated from the hollow part 76, and slides the battery 10 downward (sliding dismount).

At the time of sliding mount and dismount, the battery 10 is guided in a sliding direction by virtue of the rails 69 entering guide grooves 78, which are formed on the left and right of the rear surface of the battery mount part 8 such that they are recessed forward and extend up and down.

Referring now to FIGS. 11 and 12, the controller 38 of the battery mount part 8 is a thin member that has a rectangular parallel epipedal shape, is disposed parallel to the terminal 36, and comprises a circuit board, which is not shown. It is noted that a device for changing the speed of the motor 11 may be installed on the circuit board. In addition, the controller 38 may be disposed in the handle part 6 or in the main body part 4 and may be oriented in a direction that crosses the terminal 36, such as the direction of the central axis of the handle part 6.

The main switch 34 of the handle part 6 comprises: a switch lever 80, which serves as an operation part and is capable of an operation in which it is pushed by the user; and a main switch main body part 82, which is switched ON-OFF by manipulating the switch lever 80.

The switch lever 80 is disposed on the lower side of the main switch main body part 82 and is exposed on the exterior of the housing 2.

The main switch main body part 82 is disposed inside the housing 2 and, on its lower part, has a pushbutton 83 that switches ON by being pushed-in and switches OFF by the release of the pushing in and thereby returning downward.

The terminal 36, the controller 38, the main switch main body part 82, and the motor 11 are connected, by lead wires that are not shown, such that they are capable of supplying electric power from the battery 10 to the motor 11 or are capable of sending signals. A filter 86, which has a tubular shape and bundles the lead wires and reduces noise, is disposed on the outer side of the lead wires between the controller 38 and the main switch main body part 82.

Figure 16B:
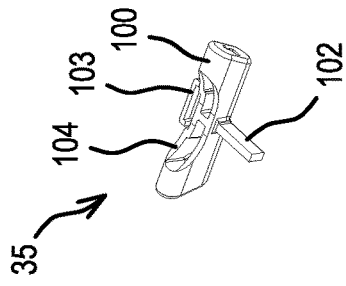
FIG. 16B is an oblique view of a lock OFF lever 35.
Figure 16C:
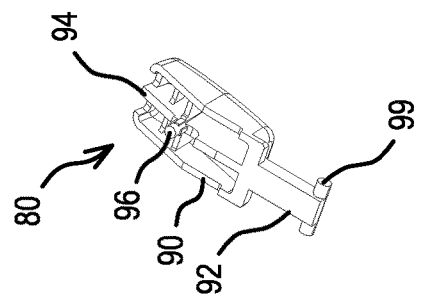
FIG. 16C is an oblique view of a switch lever 80.
Figure 16A:
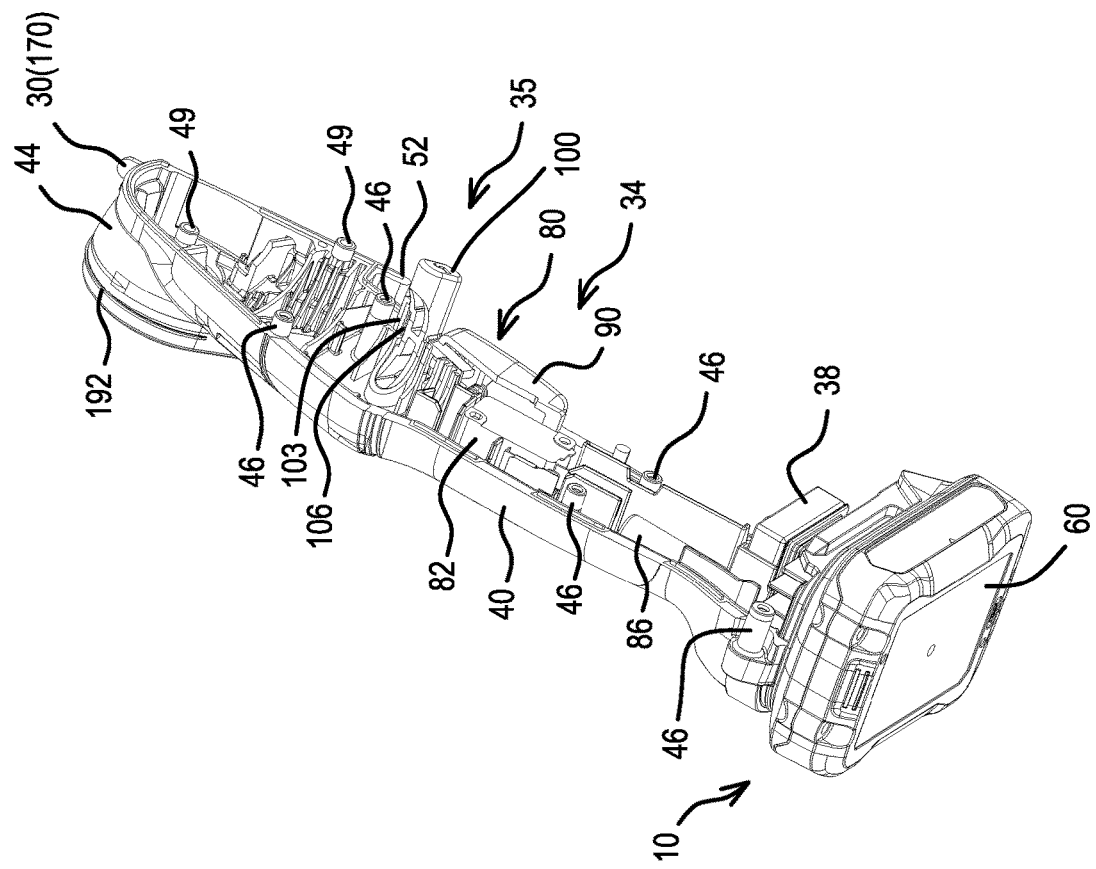
FIG. 16A is an oblique view wherein a motor 11, a gear assembly 12, and a right housing 42 are omitted.

Referring now to FIGS. 16A-16C, the switch lever 80 comprises: a switch lever main body part 90, which is exposed downward on the exterior of the housing 2; and an arm part 92, which is formed such that it extends rearward from the switch lever main body part 90.

The switch lever main body part 90 is a bathtub shaped portion that comprises, in an inner part (the center in the left right direction), a plate shaped part 94 extending in the front rear direction and protruding upward. A lower surface of the switch lever main body part 90 is a curved surface that projects outward (downward) and is configured such that it is easy for the user to push, regardless of which portion the user grasps. A spring retaining part 96, which has a circular columnar shape and protrudes farther upward, is provided on a center part of the plate shaped part 94. The spring retaining part 96 holds a lower part of a coil spring 98, which is an elastic body and extends up and down. An upper part of the coil spring 98 is held by a rib, which is provided such that it protrudes rightward from an inner surface of the left housing 40. The pushbutton 83 of the main switch main body part 82 is adjacent to the rear part of the plate shaped part 94 (the portion rearward of the spring retaining part 96).

A shaft part 99, which extends in the left right direction, is formed on a front end part of the arm part 92. By virtue of the shaft part 99 being rotatably received by inner surfaces of the housing 2, the switch lever 80 is capable of rocking about the shaft part 99.

When the switch lever main body part 90 is pushed upward, the pushbutton 83 is pushed in upward by the rear part of the plate shaped part 94, and thereby the main switch main body part 82 switches ON. In addition, when the pushing in of the switch lever main body part 90 is released, the switch lever 80 returns downward owing to the return force of the pushbutton 83, the elastic force of the coil spring 98, etc. The return position of the switch lever 80 is defined by where the arm part 92 hits the inner surface of the housing 2. At the return position, the pushbutton 83 is not pressed in and the main switch main body part 82 switches OFF. It is noted that, in FIG. 11 and FIG. 15, the switch lever 80 is at the return position.

The main switch main body part 82 changes the switch state in accordance with the pressing in of the switch lever 80 and the pushbutton 83, and the controller 38 turns the supply of electrical current to the motor 11 ON/OFF in accordance with that switch state.

In addition, the controller 38 comprises a control circuit 201 (refer to FIG. 18A) of the battery 10, which is described below. It is noted that the control circuit 201 may be disposed other than on the controller 38.

The control circuit 201 comprises a high temperature protection circuit, which cuts off the electric supply in case the temperature of the battery 10 becomes high. That is, a thermistor 208, which detects the temperature of a battery cell V1s, is built into the battery 10. Therefore, when the temperature detected by the thermistor 208 becomes a threshold value or higher, the control circuit 201 cuts off the supply of electrical current to the motor 11 of the battery 10. It is noted that the control circuit 201 may cut off the supply of electrical current to the battery 10 when a temperature that is equal to or higher than the threshold has been detected multiple times within a prescribed time, or the like; that is, the requirement, etc. of the temperature or the cutoff in the control circuit 201 may be variously modified.

In addition, the control circuit 201 comprises an overcurrent protection circuit that cuts off the electric supply in the situation in which an overcurrent is supplied. That is, the control circuit 201 ascertains the electric current value of the conducting current during operation of the multi-cutter 1 (during drive of the motor 11). Then, if that measured electric current value has become a threshold value or greater, the supply of electrical current to the motor 11 of the battery 10 is cut off. It is noted that the requirement, etc. of the electric current value or the cutoff in the control circuit 201 may be variously modified.

Furthermore, the control circuit 201 comprises an over discharge protection circuit that cuts off the electric supply in the situation in which an over-discharge occurs. That is, the control circuit 201 ascertains the voltage value of the battery 10. Then, if that measured voltage value has become a threshold value or less, the supply of electrical current to the motor 11 of the battery 10 is cut off. It is noted that the requirement, etc. of the voltage value or the cutoff in the control circuit 201 may be variously modified. In addition, at least any one from among the high temperature protection circuit, the overcurrent protection circuit, and the over discharge protection circuit may be omitted.

The lock OFF lever 35 is a member that has a rod shape and extends to the left and right, and is movable to the left and right within a prescribed range of motion when the lock OFF lever 35 is passed through the housing 2 at an adjacent location (on the lower side) of the motor 11 and the center part of the lock OFF lever 35 is located inside the housing 2. The lock OFF lever 35 is unmovable to the front and rear, up and down, and the like.

The lock OFF lever 35 comprises a lock OFF lever main body part 100; a protruding part 102, which has a columnar shape and extends rearward from a center part of the lock OFF lever main body part 100; and a spring retaining part 103, which has a bathtub shape and protrudes forward from the center part of the lock OFF lever main body part 100.

A recessed part 104, which is recessed downward in an elliptical tubular surface shape, is formed on a center upper part of the lock OFF lever main body part 100. A lower part of the motor 11 is contained inside the recessed part 104, and the recessed part 104 circumvents (surrounds) the motor 11.

The protruding part 102 reaches an upper side of a front part of the plate shaped part 94 of the switch lever main body part 90 of the switch lever 80.

A spring 106, which serves as an elastic body, is held in the spring retaining part 103 such that it is capable of expanding and contracting in the left right direction. One end of the spring 106 contacts an inner wall of the spring retaining part 103, and the other end contacts an inner surface of the left housing 40.

When the lock OFF lever 35 is located at the center of its range of motion, the spring 106 is at its natural length and the protruding part 102 is positioned directly above the front part of the plate shaped part 94 at the return position (on the pushed-in side of the switch lever 80), contacts the plate shaped part 94, and blocks (locks) the upward rocking of the switch lever 80.

On the other hand, when the lock OFF lever 35 is moved to the left or to the right in its range of motion against the biasing force of the spring 106, the protruding part 102 shifts to the left or to the right of the plate shaped part 94, becomes enabled to advance relatively into the switch lever main body part 90, which has been pushed upward, and permits (unlocks) the upward rocking of the switch lever 80. Even if the protruding part 102, which has entered the switch lever main body part 90, attempts to return to the center position owing to the spring 106, it is stopped by a left surface or by a right surface of the plate shaped part 94.

When the switch lever 80 returns from the pushed-in position to the return position, the lock OFF lever 35 is returned to the center by the spring 106, and the switch lever 80 is locked until the lock OFF lever 35 is manipulated by being moved to the left or the right.

The recessed part 104 of the lock OFF lever 35 has a shape such that it circumvents the motor 11 (making light contact with the motor 11 or being spaced apart from the motor 11) at any position within the range of motion of the recessed part 104.

Referring now to FIGS. 11-14, the motor 11 is flanged and is inserted into the left housing 40 and the right housing 42 (the rear part of the main body part 4). It is noted that the motor 11 may be a brushless motor (a brushless DC motor).

The gear case 22 of the gear assembly 12 comprises: a rear gear case 110, which has a tubular shape and has a motor connection part 23 on its rear part; and an upper gear case 112 and a lower gear case 114, which are half housings and are connected to a front end part of the rear gear case 110.

The divided surfaces of the gear case 22 are the surfaces (lower in the front) of the upper gear case 112 and the lower gear case 114 extending to the front, rear, left, and right and the surfaces (having the upper part forward of the lower part) of the rear gear case 110 extending up, down, left, and right and cross (substantially intersect with) the divided surfaces of the left housing 40 and the right housing 42 extending to the front, rear, up, and down.

The motor connection part 23 of the rear gear case 110 has: a motor shaft hole 116; and screw holes 118 above and below the motor shaft hole 116. The motor 11 is mounted on the motor connection part 23 by screws 120, which are passed through the screw holes 118. The motor shaft 20 (the pinion 21) passes through the inside of the motor shaft hole 116.

A plurality of screw holes 122 is provided in the upper gear case 112, screw boss parts 124 are provided at locations corresponding to the lower gear case 114, a screw 126 is passed through each screw hole 122 and screw boss part 124 pair, and thereby the upper gear case 112 and the lower gear case 114 are assembled together.

The gear assembly 12 comprises: a planetary gear mechanism 130; a spindle 132, which has a circular columnar shape and extends to the front and rear; a first bevel gear 134, which is held by a rear end part of the spindle 132; and a second bevel gear 136, which is held by a center part of the output shaft 24. The central axes of the planetary gear mechanism 130, the spindle 132, and the first bevel gear 134 each coincide as a central axis M1 of the gear assembly 12 and are aligned with the direction of the central axis of the main body part 4. The central axis M1 of the gear assembly 12 and the central axis of the main body part 4 coincide in top view.

The planetary gear mechanism 130, which serves as a speed reducing mechanism, comprises: an internal gear 140, which has a circular cylindrical shape and is held by the rear gear case 110; a first stage planet gear group (three planet gears 141), which revolve while rotating on an inner side of a rear part of the internal gear 140; a plate 142, which has a ring shape and is disposed on a rear surface side thereof; a first stage carrier 144, which revolves and rotatably supports each of the planet gears 141 via rearward-projecting pins 143; a second stage planet gear group (three planet gears 146), which mesh with a gear part 145 at the center of a front part of the carrier 144 and revolve while rotating on an inner side of a front part of the internal gear 140; and a second stage carrier 148, which revolves and rotatably supports the second stage planet gear group via rearward-projecting pins 147. The pinion 21 of the motor shaft 20 meshes with the first stage planet gears 141. A spindle hole 149, which holds a rear end part of the spindle 132, is formed in a center part of the second stage carrier 148. It is noted that the planetary gear mechanism 130 is not limited to two stages and may be one stage or three or more stages. In addition, a speed reducing mechanism other than the planetary gear mechanism 130 may be used, or the speed reducing mechanism may be omitted.

The spindle 132 is configured as a widened-diameter part, in which the diameter of the center part is greater than that of both end parts, and is rotatably supported by a bearing 150, which is disposed on (around) that widened-diameter part. A ring 152, which positions the carrier 148, is provided between the bearing 150 and the carrier 148 on wall bodies provided on the upper gear case 112 and the lower gear case 114 such that they protrude inward from inner surfaces of the upper gear case 112 and the lower gear case 114.

The first bevel gear 134 of the spindle 132 meshes with the second bevel gear 136 of the output shaft 24.

An oilless bearing 154 is disposed on a right end part of the output shaft 24. In addition, the left end part of the output shaft 24 is configured as a widened-diameter part in which its diameter is greater than that of other portions, and a ball bearing 156 is disposed on that widened-diameter part. The output shaft 24 is rotatably supported by the oilless bearing 154 and the ball bearing 156 and is stably supported by virtue of two bearings being disposed for the single output shaft 24. In addition, because the ball bearing 156, which has a high stress resistance capability, is disposed in the vicinity of a fixed part of the second bevel gear 136, which is subject to comparatively large stress, and because the oilless bearing 154, which is low cost and compact, is disposed on a base end part of the output shaft 24, which is subject to comparatively small stress, the multi-cutter 1 becomes low cost and compact and the ease of operation of the multi-cutter 1 improves while at the same time the support mechanism of the output shaft 24 is furnished with the necessary and satisfactory capability. It is noted that other types of bearings may be used as the oilless bearing 154, the ball bearing 156, and other bearings.

The left end part of the output shaft 24 is exposed from the gear case 22 and the left housing 40. A central axis M2 of the output shaft 24 (a rotary shaft of the rotary blade 26) forms an angle (90°) with respect to the central axis M1 and is oriented in the left right direction. The first bevel gear 134 and the second bevel gear 136 constitute a direction changing mechanism, which changes the direction of the motive power. The direction changing mechanism may be other than a combination of bevel gears or may be used together with a speed reducing function. In addition, the direction changing mechanism may be omitted.

A screw hole part 160, which is for the screw 27, is formed on the left end part of the output shaft 24. The rotary blade 26 is mounted by the screw 27 being inserted into a screw hole of the screw hole part 160. A peripheral part of the screw hole of the screw hole part 160 protrudes leftward in a Φ shape.

Although the rotary blade 26 has a regular decagonal shape and its peripheral part has a blade, the rotary blade 26 may have some other regular polygonal shape or may have a circular shape. A center hole 162, which is formed in a shape corresponding to the protruding shape of the screw hole part 160, is provided at the center of the rotary blade 26; by virtue of the center hole 162 fitting onto the protruding part of the screw hole part 160, rotation of the center hole 162 relative to the output shaft 24 of the rotary blade 26 is restricted. A plurality of circular small holes 164 is arranged, in a circumferential direction, around the circumferential edge of the rotary blade 26. By providing the small holes 164, the rotary blade 26 is lightened and the heat dissipation properties are improved. It is noted that the shape of the protruding part of the screw hole part 160, the shape of the center hole 162, or the like may be some other shape, as long as relative rotation is restricted (impeded). In addition, the shape of the small holes 164 is not limited to being circular and may be polygonal, an elongated hole (slit), or the like, and the number, arrangement, or the like of the small holes 164 may be variously modified.

The base 30 comprises a base main body part 170 and a fixed blade retaining part 172.

The base main body part 170 is a member that has a folded plate shape and comprises a rear part, which has an L-shape in cross section, and a front part, which has an L-shape in cross section. It is noted that the shape of the base main body part 170 may be formed by bending a thin plate, combining a plurality of plate shaped members, joining thick plates, or the like.

The front part of the base main body part 170 is formed into a hook shape having a pointed tip, an arrowhead shape, or a tab shape. It is disposed such that a rear upper end thereof is continuous with an upper part of the fixed blade 28 and smoothly introduces the workpiece.

The length of the base main body part 170 in the front rear direction is sufficiently long, such as approximately two or more times the diameter of the rotary blade 26 or approximately three or more times the length of the fixed blade 28, and thereby the cutting of the workpiece tends to continue and the workpiece is guided rearward satisfactorily.

Figure 4:
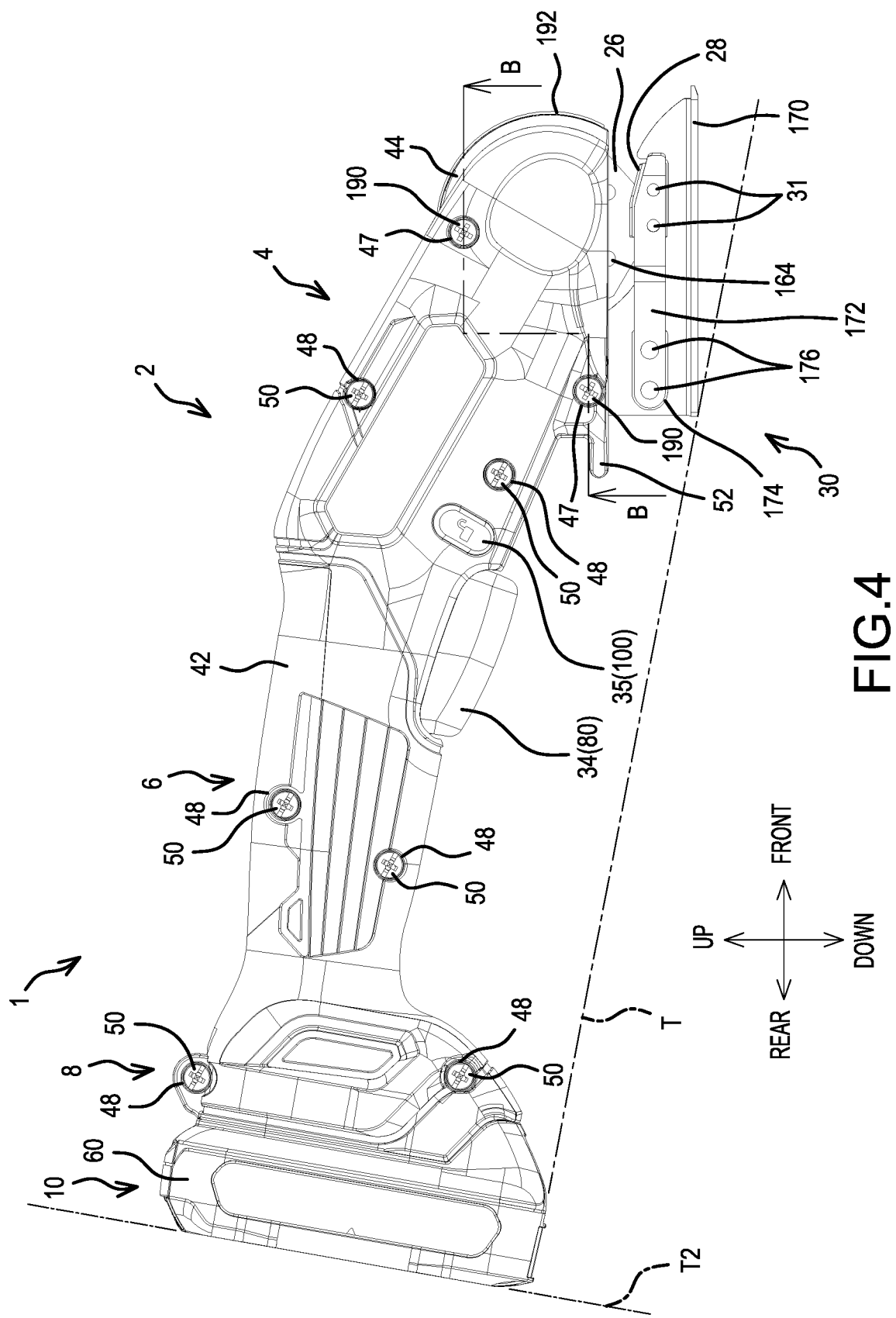
FIG. 4 is a right view of FIG. 1.
Figure 5:
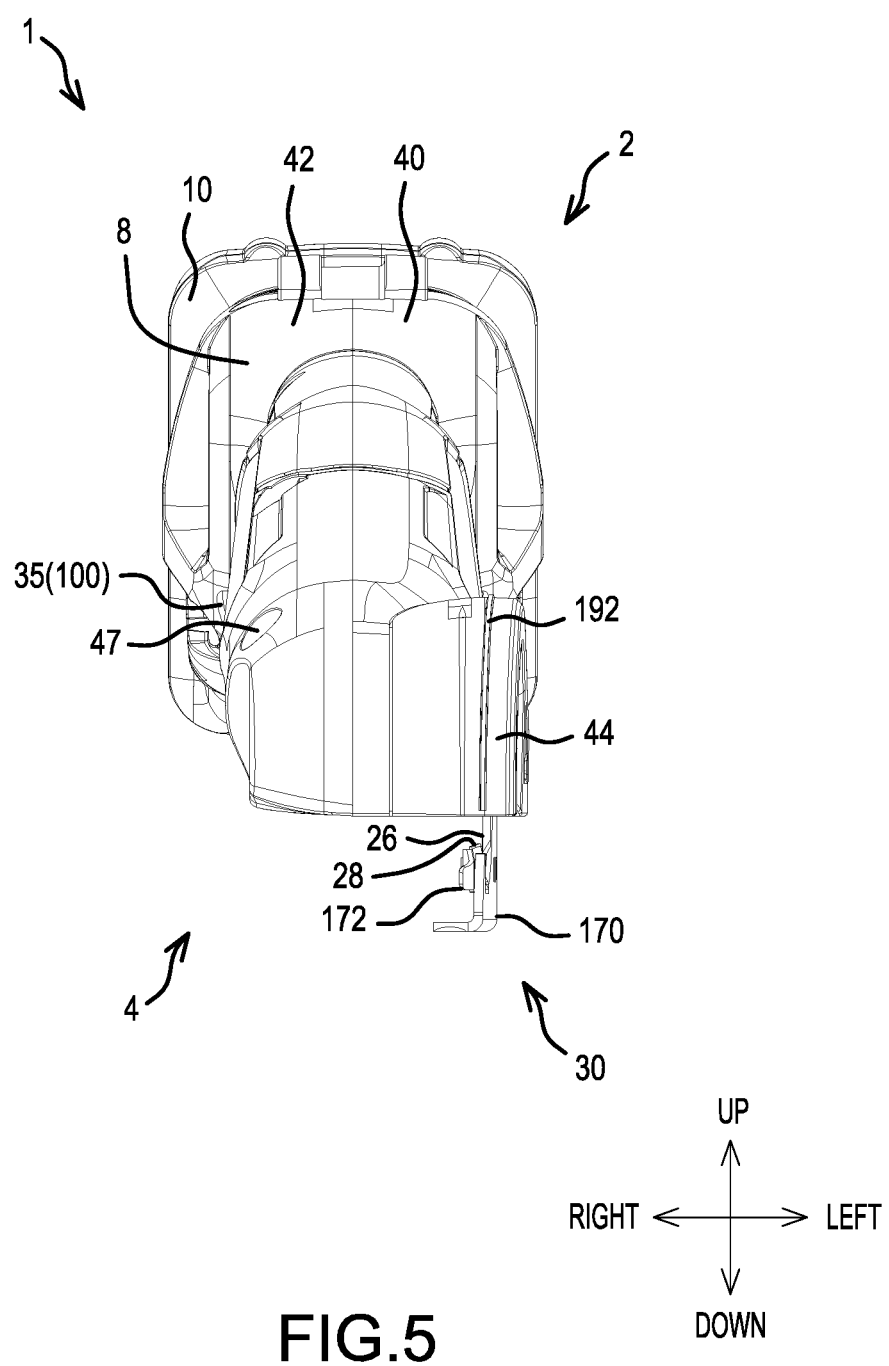
FIG. 5 is a front view of FIG. 1.
Figure 6:
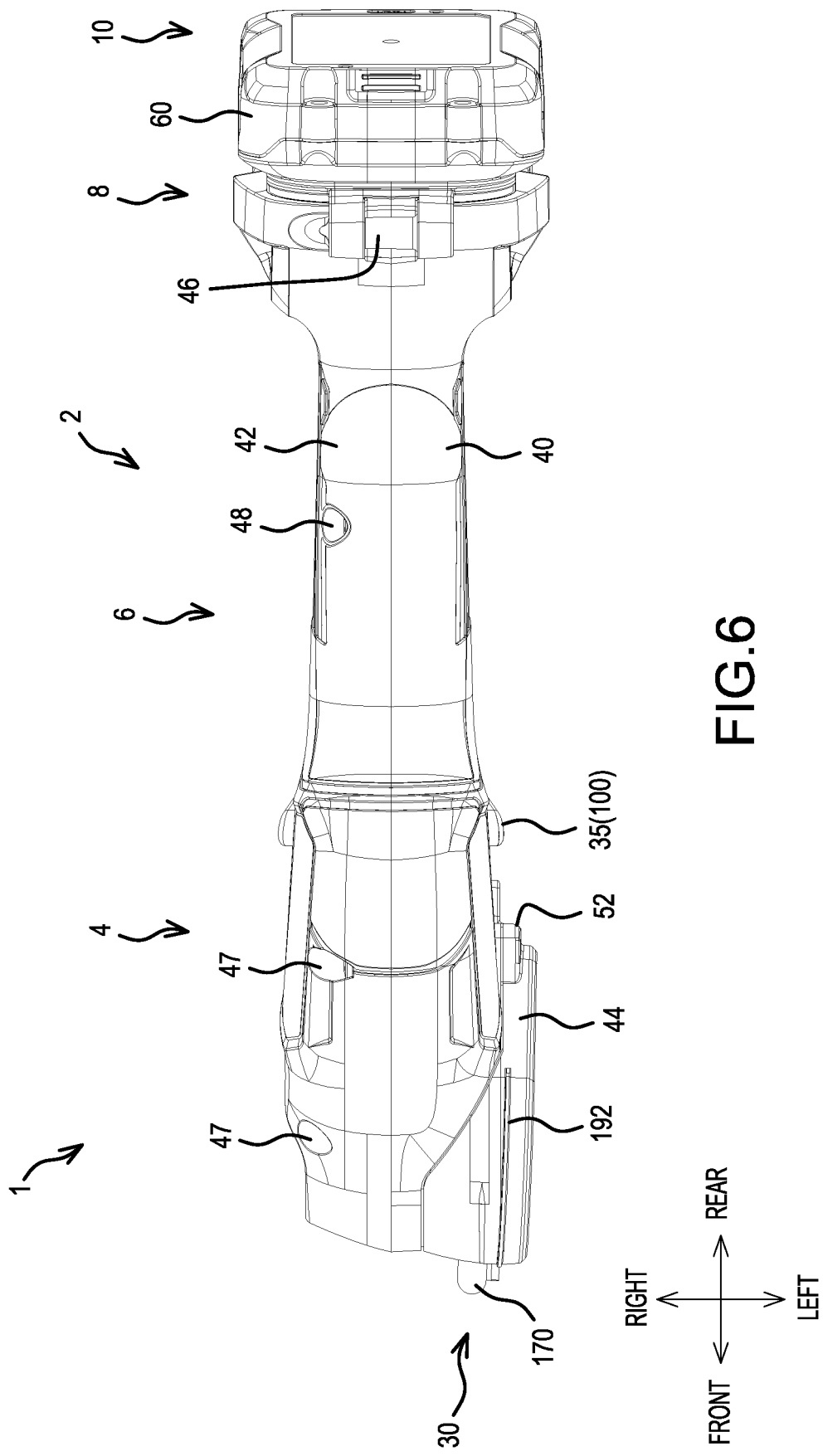
FIG. 6 is a top view of FIG. 1.
Figure 7:
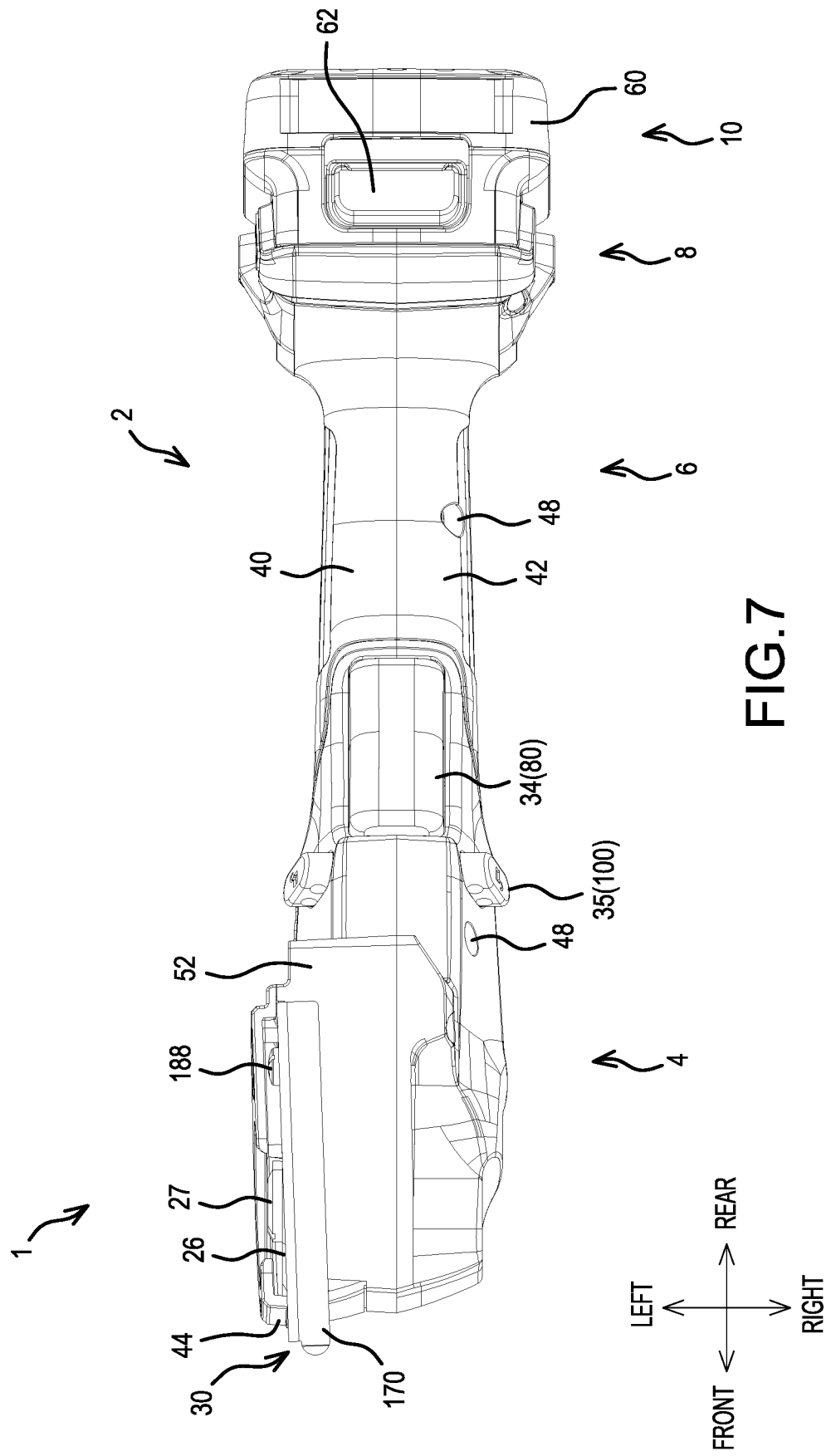
FIG. 7 is a bottom view of FIG. 1.
Figure 8:
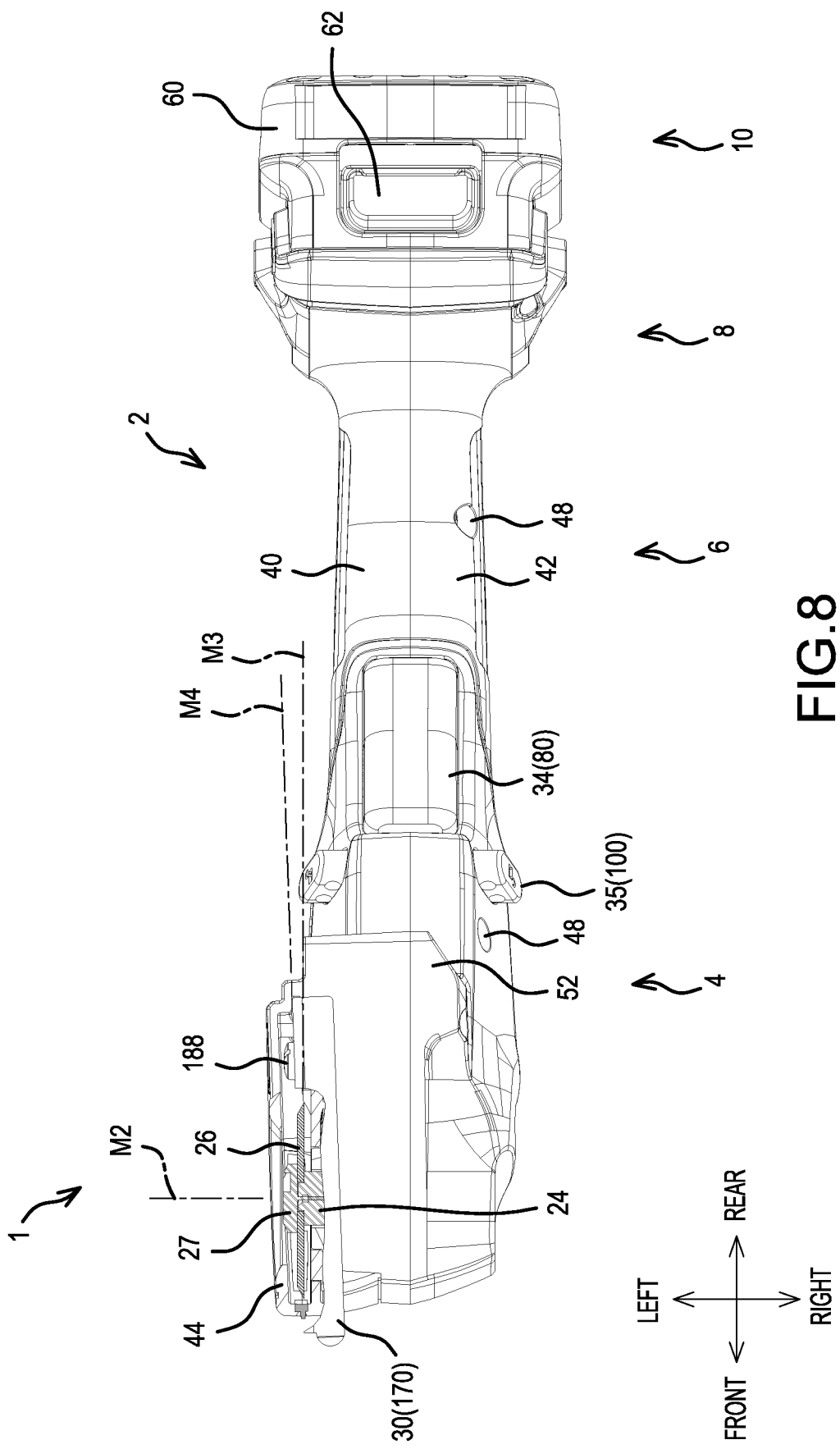
FIG. 8 is a cross sectional view taken along line A-A in FIG. 3.

In addition, as shown in FIG. 4, when a rear end part of a lower surface part of the base main body part 170 and the lower surface of the mounted battery 10 contact a planar surface T (the top surface of a desk, a floor surface, or the like), the user can raise up the multi-cutter 1 and place it on the planar surface T. The base main body part 170 is formed such that it has a lower surface part; the motor 11, which has a comparatively large weight, is disposed in the center; thus, when the battery 10 is being mounted, the comparatively heavy battery 10 and the motor 11 are separated in the front rear direction. In addition, when a rear surface of the battery 10 contacts a planar surface T2 (the top surface of a desk, a floor surface, or the like), the user can raise up the multi-cutter 1 and place it on the planar surface T2. In this situation, the comparatively heavy battery 10 is located on the lower side. Thus, the multi-cutter 1 has two types of contact orientations that use the battery 10.

Referring now to FIGS. 2B, 4, 9-12 and 15, the fixed blade retaining part 172 is a structure that has a leaf spring shape and extends to the front and rear; by virtue of a rear end part of the fixed blade retaining part 172 being restricted by a plurality of rivets 176, via a spacer 174, with respect to a right surface of a rear part of the base main body part 170, the fixed blade retaining part 172 is held by the base main body part 170. The center part of the fixed blade retaining part 172 is bent (FIG. 10) such that the rear part of the fixed blade retaining part 172 follows the base main body part 170 and the front part of the fixed blade retaining part 172 approaches the base main body part 170 in the left right direction the farther forward it goes. Furthermore, the fixed blade 28 is mounted on the front end part of the fixed blade retaining part 172. It is noted that the fixed blade retaining part 172, the fixed blade 28, or the like may be fixed by other than the rivets 176, 31, for example, they may be fixed by bolts and nuts.

A screw hole 180 and a screw boss hole 182, which is disposed rearward of the screw hole 180, are formed upward of the rivets 176 in a rear part of the base main body part 170.

When an upper end part of the base main body part 170 is inserted in a groove 184 (FIG. 12), which is oriented in the front rear direction and formed on an outer surface (upward of a hole 45) of the front end part of the left housing 40, the base main body part 170 is attached to the left housing 40 by inserting a screw 188 into a screw hole 186, which is formed downward of the groove 184 (forward of one of the holes 45), and the screw hole 180.

The one screw 188 is the sole fixing member, which attaches only the base 30 to the housing 2.

As shown in FIG. 12, an upper end part of the base main body part 170 has a protruding part 189, which protrudes forward from another portion (a rear part) of the upper end part. The upper end-part rear part, the protruding part 189, etc. extend to the front, rear, left, and right. The rear part of the upper end part has substantially the same dimension in the front rear direction as an upper side of the portion of the base main body part 170 that extends up and down (the rear part of the base main body part 170) and has substantially the same width in side view. With regard to the upper end part of the base main body part 170, owing to the protruding part 189, a sufficiently long length in the front rear direction can be ensured while circumventing the rotary blade 26, and therefore the base main body part 170 can be securely attached to the housing 2.

The fixed blade 28 has a blade, in which a left side of an upper surface is a vertex and the upper surface goes downward toward the right side, and an upper part of a left surface of the fixed blade 28 abuts a lower end part of a right surface of the rotary blade 26.

The rotary blade 26 is mounted such that its blade forms a vertex at a side part of a right surface and goes inward in the radial direction toward a side part of a left surface; it is mounted such that it is parallel to the motor shaft 20. The right surface (the urasuki surface) of the rotary blade 26 opposes the left surface of the fixed blade 28 (the urasuki surface of the fixed blade 28). In greater detail, a front upper part of the fixed blade 28 makes point contact with the rotary blade 26. It is noted that the contact between the rotary blade 26 and the fixed blade 28 may be a line contact or may be a surface contact.

The urasuki (rear side) surface of the rotary blade 26 or an extension plane thereof (refer to centerline M3 in FIG. 8) is parallel to the central axis M1 of the gear assembly 12 and is perpendicular to the central axis M2 of the output shaft 24.

A lower surface part of the base main body part 170 extending to the front, rear, left, and right is disposed downward of the fixed blade 28; the workpiece to be cut enters the space between the rotary blade 26 and the fixed blade 28; therefore, even if the fixed blade 28 moves downward greatly, the base main body part 170 (lower surface part) supports the fixed blade 28 and protects the fixed blade 28, the fixed blade retaining part 172, etc.

The blade cover 44 is a member that has a hook shape in side view and covers the screw 188, the periphery of the rotary blade 26 other than the lower part, and the like, and, as described next, is fixed to (fastened together with) the base 30, the left housing 40, the right housing 42, etc. by a common fixing member.

That is, as shown in FIG. 9, when the forward screw boss part 49 of the blade cover 44 is passed through the corresponding hole 45 of the left housing 40 and reaches the corresponding screw hole 47 of the right housing 42, a screw 190 is passed through the corresponding screw hole 47, the corresponding hole 45, and the screw boss part 49, and thereby the blade cover 44, the left housing 40, and the right housing 42 are fastened together.

In addition, when the rearward screw boss part 49 is passed through the screw boss hole 182 of the base main body part 170 and the corresponding hole 45 of the left housing 40 and reaches the corresponding screw hole 47 of the right housing 42, the corresponding screw 190 is passed through the corresponding screw hole 47, the corresponding hole 45, and the screw boss part 49 (and the screw boss hole 182), and thereby the blade cover 44, the base 30, the left housing 40, and the right housing 42 are fastened together.

Because the base 30, the fixed blade retaining part 172, and the fixed blade 28 are attached at a plurality of locations (two locations in the front and in the rear), the situation in which they rotate relative to the attachment points is prevented, and thus they are securely attached. It is noted that the attachment location of at least any of these may be one location or three or more locations.

An ink line 192 (mark), which is a straight line in the front rear direction in top view, is disposed on a center part of the blade cover 44 from the front surface to the upper surface. It is noted that the dimensions of the ink line 192 can be modified as appropriate, such as by being extended to the rear surface, omitting the portion on the front surface, narrowing or widening its width, or the like. In addition, the mark is not limited to the shape of the ink line 192, i.e. a line shape, and may be a graphic such as a triangle. If the mark is a triangle, then it is preferably disposed such that its acute angle faces forward.

The ink line 192 is a cutting direction guide for the user.

The color of the ink line 192 is changed by being formed, without printing, coating, or the like, by a multicolor (two color) integrated molding of the blade cover 44 using a color that differs from that of other portions of the blade cover 44. Here, it is formed by insert molding, in which the portion other than the ink line 192 is formed of a black resin material, and the ink line 192 is formed of a white (a color having high contrast with respect to black) resin material. In addition, the ink line 192 is formed such that it protrudes outward from the other portion of the blade cover 44 and protrudes with respect to other portions. It is noted that the method of the multicolor integrated molding, the colors, and the like are not limited to those described above; for example, two color molding may be used. In addition, the white resin material (the material of the ink line 192) and the black resin material (the material other than the ink line 192) may be the same material or different materials, and the material of the ink line 192 can be, for example, an elastomer. Furthermore, an arrow, a logo, or the like that indicates the rotational direction of the rotary blade 26 may be formed with the same color or of the same raw material as that of the ink line 192 or may be formed of a different color or a different raw material than that of the ink line 192 or of other portions thereof. In addition, in the ink line 192, the color differentiation or the protrusion may be omitted. In addition, the ink line 192 may be formed as a hollow that is recessed from the other portion.

The ink line 192 or an extension line (refer to centerline M4 in FIG. 8) thereof is tilted such that, with respect to the urasuki surface of the rotary blade 26 or the extension plane (refer to centerline M3) thereof, the farther forward it goes, the more to the right side (the side having the fixed blade 28, viewed from the rotary blade 26) it goes, and the farther rearward it goes, the more to the left side (the side spaced apart from the fixed blade 28, viewed from the rotary blade 26) it goes. In other words, the ink line 192 or the extension line thereof is disposed such that its front side is tilted toward the inner side in the left right direction, and the front part of the rotary blade 26 is left facing such that it sticks out to the left (the outer side) in the direction of the ink line 192.

In addition, a portion (the left surface) of the blade cover 44, a portion (from the base main body part 170 to the rear part of the fixed blade retaining part 172) of the base 30, etc. are also set in the same direction as the ink line 192. It is noted that the entire blade cover 44, the entire base 30, etc. may be set in the same direction as the ink line 192. In addition, at least any from among the ink line 192, the blade cover 44, and the base 30 does not have to be tilted. Furthermore, the urasuki surface of the rotary blade 26 may be tilted from the direction of the central axis M1 of the gear assembly 12, the direction of the main body part 4, or the like, and in this situation, at least any from among the ink line 192, the blade cover 44, the base 30, etc. may be set in the same direction as the direction of the central axis M1, the direction of the main body part 4, etc.

Thus, by virtue of the ink line 192, the blade cover 44, and the base 30 being tilted with respect to the urasuki surface of the rotary blade 26 or the extension plane thereof, the cutting direction guide becomes close to the fixed blade 28, viewed from the rotary blade 26, it becomes difficult to apply a force that works to draw the fixed blade 28 toward the outer side (the right side), and thereby stable cutting is ensured.

This can be more clearly understood by considering the situation in which the user cuts using a direction that curves greatly to the left as the cutting direction. That is, in this situation, the fixed blade 28 is subject to a rightward force from the workpiece, and there is a possibility that the fixed blade 28 will move to the right side and separate such that it draws away from the rotary blade 26. In contrast, conversely, in the situation in which the user performs cutting such that the cut curves greatly to the right, the fixed blade 28 is subject to a leftward force, whereupon the fixed blade 28, which attempts to move to the left, is caught by the rotary blade 26 and thereby the drawing of the fixed blade 28 away is ultimately hindered.

In the multi-cutter 1, the ink line 192, the blade cover 44, and the base 30 are tilted with respect to the urasuki surface of the rotary blade 26 or the extension plane thereof, so the drawing of the fixed blade 28 away is prevented and the cutting of a left curve is stabilized.

If the angle of the ink line 192, the blade cover 44, and the base 30 with respect to the urasuki surface of the rotary blade 26 or the extension plane thereof is too small, then the improvement of cutting stability is not sufficiently achieved; and if it is too large, then the rotary blade 26 deviates from the actual cutting direction and the function that serves as the cutting guide is hindered; therefore, the angle is preferably 1° or more and 5° or less and more preferably 2° or more and 4° or less. It is noted that at least any of the ink line 192, the blade cover 44, and the base 30 may be tilted at different angles to one another.

Figure 10:
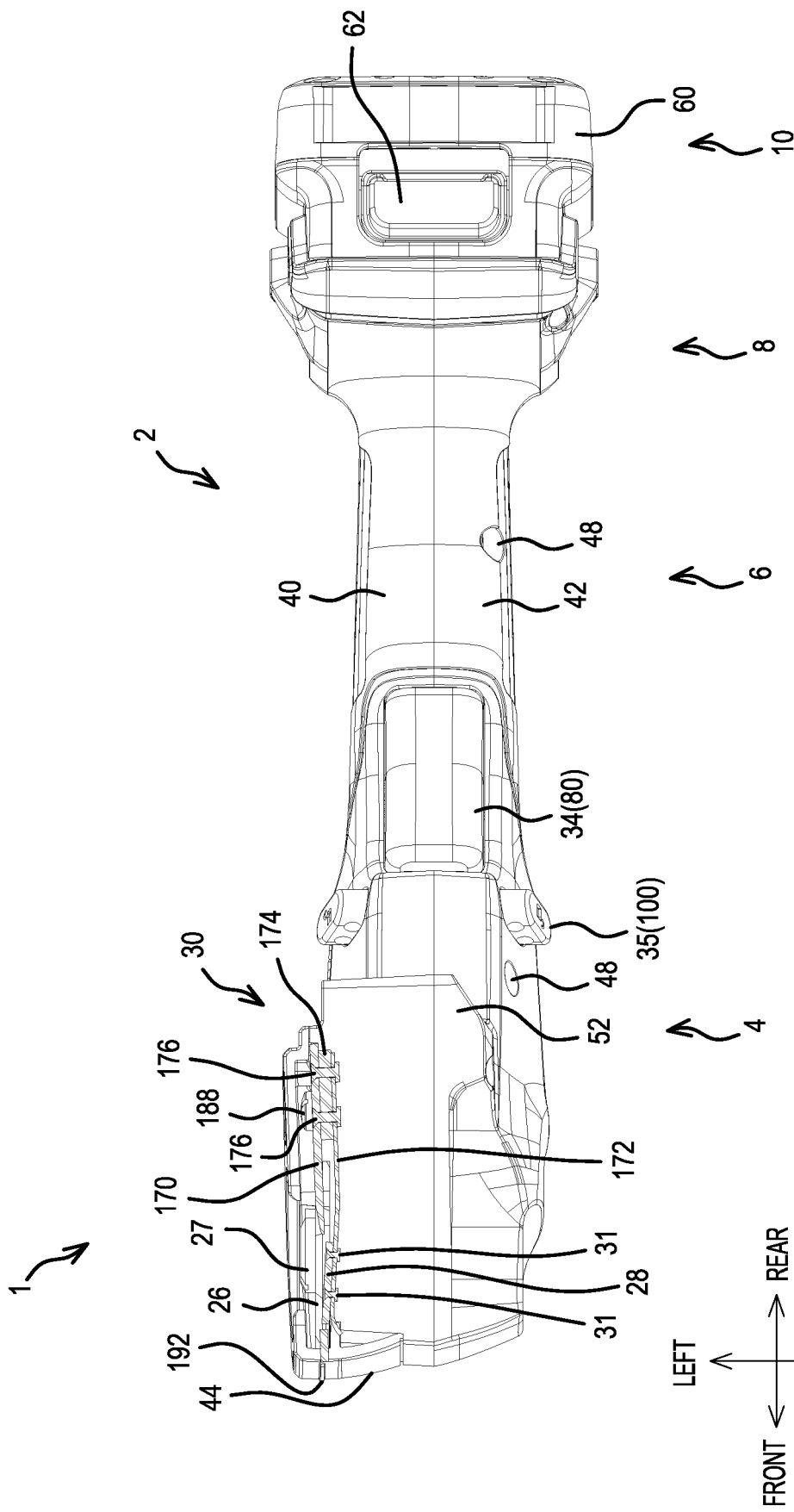
FIG. 10 is a cross sectional view taken along line C-C in FIG. 3.
Figure 17A:
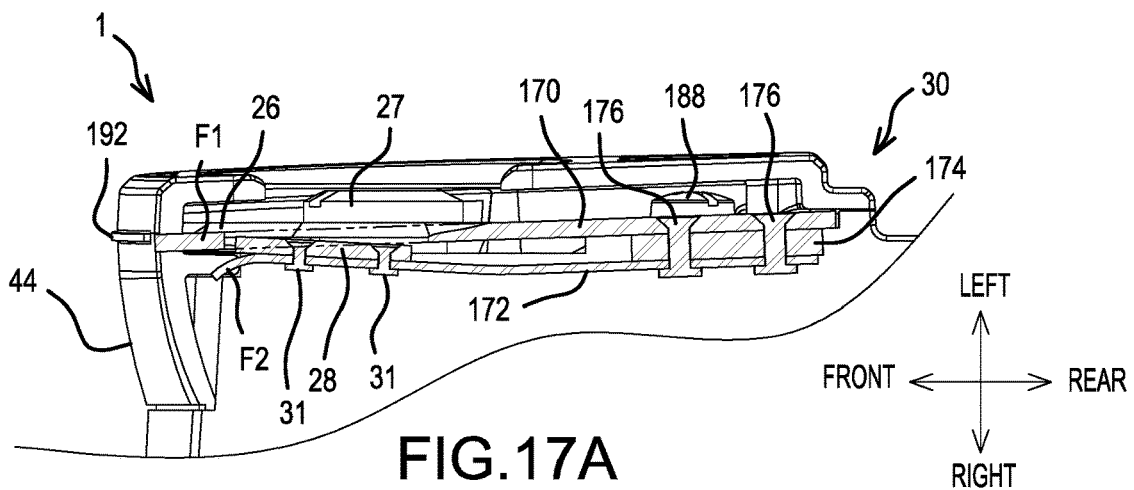
FIG. 17A is an enlarged view of a front part of FIG. 10.
Figure 17B:
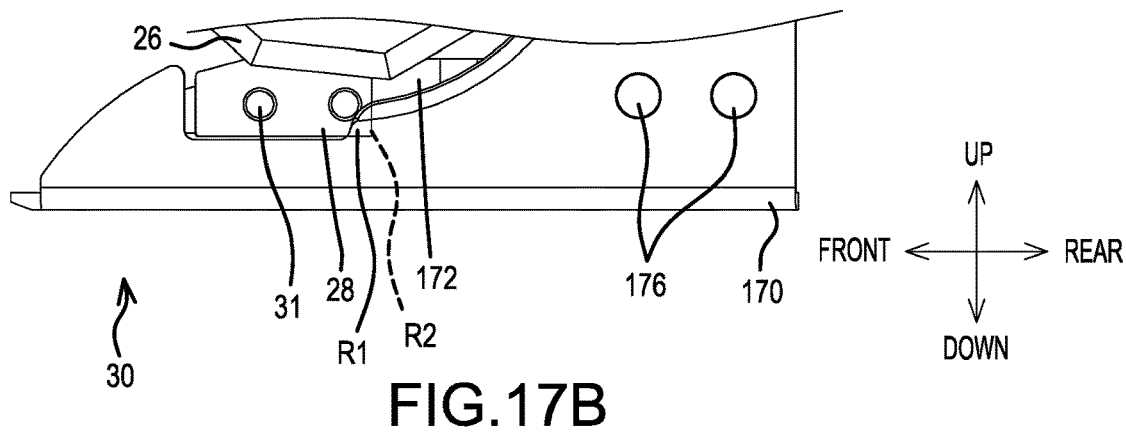
FIG. 17B is an enlarged view of a front lower part of FIG. 3.

FIG. 17A is an enlarged view of the front part of FIG. 10, FIG. 17B is an enlarged view of the front lower part of FIG.

Figure 3:
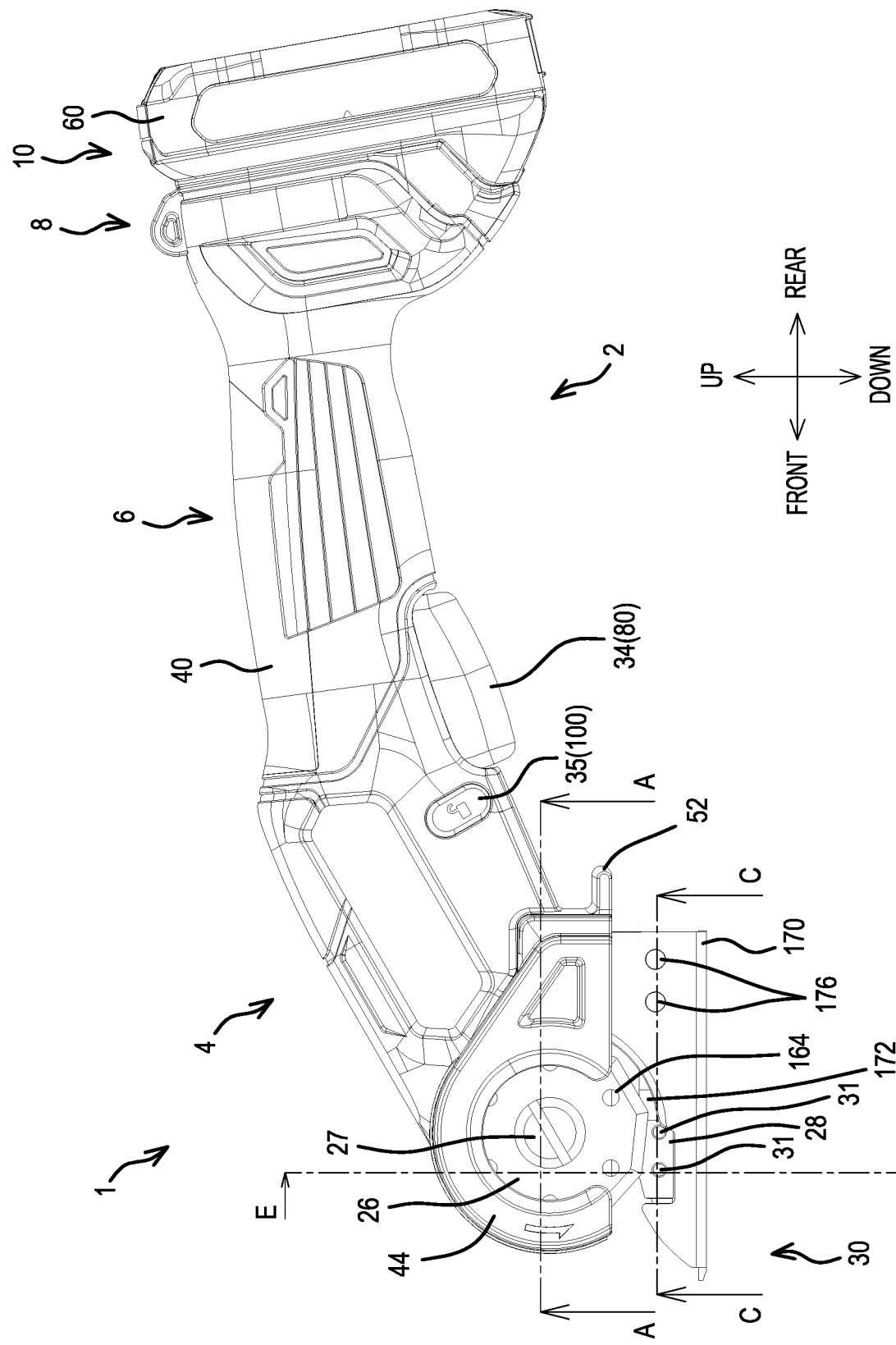
FIG. 3 is a left view of FIG. 1.
Figure 17C:
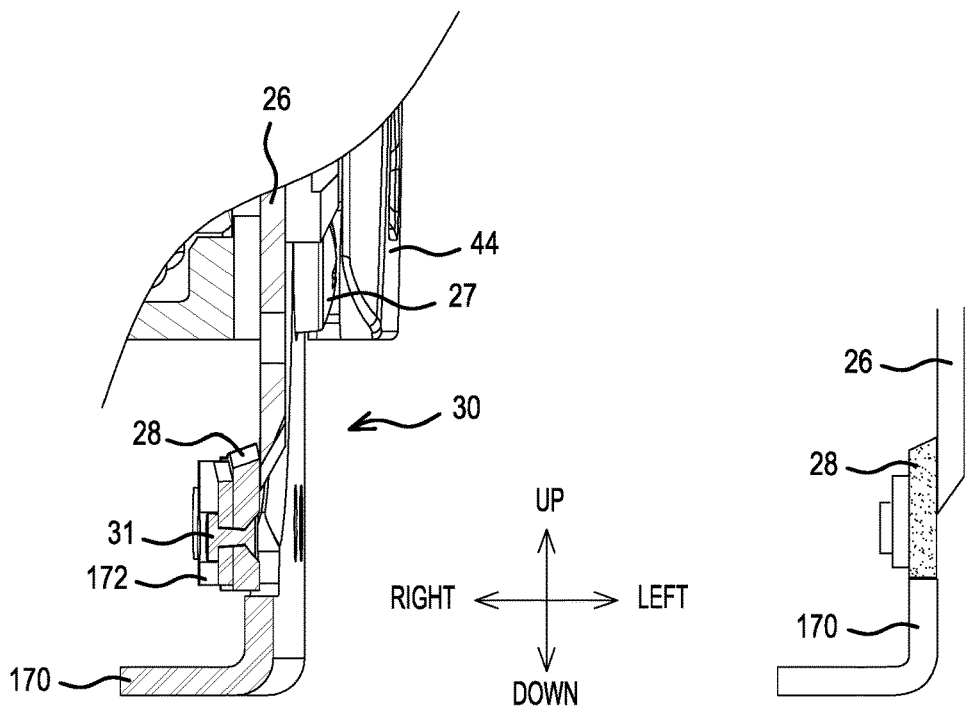
FIG. 17C is a cross sectional view taken along the lower part of line E-E in FIG. 3.

3, and FIG. 17C is a cross sectional view taken along the lower part of line E-E in FIG. 3 and is a cross sectional view that includes the contact point between the rotary blade 26 and the fixed blade 28.

As shown in particular in FIG. 17A, a hook shaped front end part F1 of the base main body part 170 is located leftward of a front end part F2 of the fixed blade retaining part 172 and overlaps the front end part F2 in side view (in particular, when viewed rightward from the left side), i.e. it overlaps in the left right direction. The front end part F1 of the base main body part 170 is adjacent to the front part of the fixed blade 28 (the adjacent portion of the front part of the fixed blade). The front end part F2 of the fixed blade retaining part 172 is thereby bent with respect to the rearward portion such that the farther forward it goes, the farther rightward it goes (the direction away from the base main body part 170).

In addition, as shown in particular in FIG. 17B, a tab lower end part R1, which is an arcuate front side lower end part with regard to the rear part of the base main body part 170 that extends in the up down direction, is located leftward of a rear lower part R2 of the fixed blade 28 and overlaps the rear lower part R2 in side view, i.e. it overlaps in the left right direction. The tab lower end part R1 of the base main body part 170 is adjacent to the rear part of the fixed blade 28 (the adjacent portion of the rear part of the fixed blade).

Owing to the spacing between the front end parts F1, F2 between the base main body part 170 and the fixed blade retaining part 172 and the spacing between the tab lower end part R1 and the rear lower part R2 between the base main body part 170 and the fixed blade 28, leftward movement of the fixed blade 28 is permitted, and leftward movement beyond those spacings is hindered. When the fixed blade 28 moves leftward to the extent of these spacings owing to the force acting from the workpiece, the front end part F1 of the base main body part 170 and the tab lower end part R1 contact the front end part F2 of the fixed blade retaining part 172 and the rear lower part R2 of the fixed blade 28, and thereby farther leftward movement of the fixed blade 28 beyond that is kept in check.

It is noted that the base main body part 170 may overlap the fixed blade 28 at the front end part F1 in side view and may overlap the fixed blade retaining part 172 at the tab lower end part R1 in side view. In addition, the base main body part 170 may overlap the fixed blade retaining part 172, the fixed blade 28, or the like in side view at any one of front end part F1 and tab lower end part R1. Furthermore, the base main body part 170 may overlap the fixed blade retaining part 172, the fixed blade 28, or the like in side view at a portion other than the front end part F1 and the tab lower end part R1.

In addition, as shown in particular by a chain double dashed line in FIG. 17A (corresponding to the lower part of the base main body part 170), FIG. 17C, etc., the lower part of the base main body part 170 overlaps the fixed blade 28 in top view, i.e. it overlaps in the up down direction.

That is, the fixed blade 28, which extends up, down, front, and rear, is located upward of a thick walled part (the thickness in the left right direction) of a standing portion of the lower part of the base main body part 170.

In greater detail, in an uncut state, the right part of the thick walled part of the base main body part 170 overlaps the front left part of the fixed blade 28 in top view, overlaps, in the left right direction, as much as half of the thickness of the thick walled part of the base main body part 170 and as much as two thirds of the thickness of the fixed blade 28 in the vicinity of the contact point between the rotary blade 26 and the fixed blade 28, and overlaps substantially the entire thickness of the thick walled part of the base main body part 170 and substantially the entire thickness of the fixed blade 28 in the vicinity of a front end of the fixed blade 28. The spacing between the base main body part 170 and the fixed blade 28 is set to less than the assumed approximate maximum thickness of the workpiece. It is noted that the portion, amount, and the like of the overlap can be variously modified.

Figure 17D:
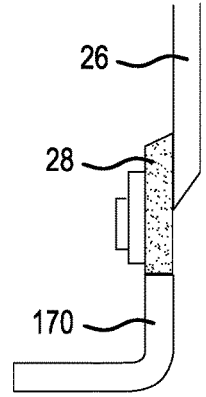
FIG. 17D is an end surface schematic diagram corresponding to FIG. 17C according to a sixth embodiment of the present disclosure.

Thus, the base main body part 170 has a spacing with respect to the fixed blade 28 and, by overlapping in the up down direction, in the situation in which the fixed blade 28 is subject to a downward force from the workpiece, downward movement of the fixed blade 28 to the extent of the thickness of the workpiece is permitted, and downward movement beyond that is hindered by the contact of the fixed blade 28 with the base main body part 170. Furthermore, the fixed blade 28 is supported by the base main body part 170 due to such contact; furthermore, by virtue of the fixed blade 28 being subject to a downward force, situations in which the fixed blade 28 is tilted leftward, such that the upper part becomes the left side with respect to the lower part, the fixed blade 28 is conversely tilted rightward, or the like, are prevented. The support of the fixed blade 28 by the base main body part 170 is also seen in FIG. 17D. It is noted that the dimensions of the various spacings may be increased or decreased, and the various spacings may be omitted.

The control circuit 201 of the battery 10 is shown in FIG. 18A.

The control circuit 201 of the battery 10 comprises: a remaining charge detection circuit 202; a remaining charge display circuit 204, which comprises four light emitting diodes LED1s-LED4s connected to the remaining charge detection circuit 202; a remaining charge display switch 206, which is connected to the remaining charge detection circuit 202; a thermistor 208; a power supply plus terminal 210; a power supply minus terminal 212; and battery side communication terminals 214, 216, 218.

A surface portion of the battery 10 includes the remaining charge display switch 206 and the remaining charge display circuit 204 (not shown other than in FIG. 18A). These are disposed on a surface portion of the battery 10 other than the portion (front surface) that is hidden by the battery mount part 8 and here they are disposed on an upper surface part of the battery 10. In addition, the power supply plus terminal 210 is provided in the plus terminal slit 64 of the battery 10, the power supply minus terminal 212 is provided in the minus terminal slit 66, and the battery side communication terminals 214, 216, 218 (not shown other than in FIG. 18A) are provided in the communication terminal slit 68. Furthermore, the battery 10 comprises three battery cells V1s-V3s.

The plus terminal 70 of the battery mount part 8 contacts and is electrically connected to the power supply plus terminal 210 of the battery 10 in the mounted state; likewise, the minus terminal 72 is connected to the power supply minus terminal 212, and communication terminals 74 are connected to the battery side communication terminals 214, 216, 218.

The remaining charge detection circuit 202 detects the remaining charge of the battery 10 in accordance with the voltage of the battery cells V1s-V3s; when the remaining charge detection circuit 202 receives an ON signal from the remaining charge display switch 206, the remaining charge detection circuit 202 causes the remaining charge display circuit 204 to display the remaining charge of the battery 10. For example, the remaining charge detection circuit 202 increases the number of light emitting diodes turned ON, one at a time for each one quarter that the remaining charge reaches the maximum capacity during use, and turns all OFF after a prescribed time has elapsed. The user can confirm the remaining charge of the battery 10 on the remaining charge display circuit 204 (remaining charge indication part), whether in the mounted state or the removed state, by operating the remaining charge display switch 206. In the mounted state, the remaining charge display switch 206 is located at an upper part and therefore is easy to operate, and the remaining charge display circuit 204 is located at an upper part and therefore is reliably visible. It is noted that the remaining charge of the battery 10 may be displayed in a mode other than turning some or all of the four light emitting diodes LED1s-LED4s ON and OFF.

The thermistor 208 is connected to the battery side communication terminal 218 (T terminal) and is disposed at a location adjacent to the battery cell V1s; information concerning its resistance value, i.e., temperature information of the battery 10 (the battery cell V1s), can be provided via the battery side communication terminal 218.

In addition, the battery side communication terminal 214 (V1 terminal) is connected to the battery cell V1s and can provide information concerning the voltage of the battery cell V1s with respect to the power supply minus terminal 212. Furthermore, the battery side communication terminal 216 (V2 terminal) is connected to the battery cells V1s, V2s and can provide information concerning the voltage of the battery cells V1s, V2s with respect to the power supply minus terminal 212.

An operation example of the multi-cutter 1 as described above will now be explained.

The user slidably mounts the charged battery 10 on the battery mount part 8, grasps the handle part 6, and pushes the switch lever 80 up while pressing the lock OFF lever 35 left or right, whereupon the main switch main body part 82 switches and thereby electric current is supplied from the battery 10 to the motor 11 and the motor shaft 20 of the motor 11 is driven. The switch lever 80 switches the motor 11 ON/OFF via the main switch main body part 82 and is a switch operation part that turns the motor 11 ON/OFF; the switch lever 80 and the main switch main body part 82 constitute a switch of the motor 11.

The speed of the rotational force of the motor shaft 20 is reduced by the planetary gear mechanism 130 of the gear assembly 12, the direction of the rotational force is changed by the first bevel gear 134 and the second bevel gear 136, the rotational force is transmitted to the spindle 132, and the rotational force of the spindle 132 is transmitted to the rotary blade 26 via the output shaft 24. The rotary blade 26, by rotating, causes the contact position relative to the fixed blade 28 to move back and forth.

When the user introduces a workpiece, such as paper, fabric, or a thin sheet, into the space between the rotary blade 26 and the fixed blade 28 from the front side thereof, the user causes the rotary blade 26 to rotate and moves the workpiece, using the ink line 192 as a guide, relative to the rotary blade 26, the fixed blade 28, and the like in the desired cutting direction, and cuts the workpiece by feeding it rearward.

The above-mentioned multi-cutter 1 comprises: the motor 11; the rotary blade 26, which is driven by the motor 11; the fixed blade 28, which is disposed opposing the rotary blade 26; the housing 2, in which the motor 11 is held; and the battery mount part 8, which is formed on the housing 2 and on which the battery 10 for a power tool is mountable; and the battery mount part 8 has the guide grooves 78 that guide the battery 10. Thereby, when the user mounts the battery 10 after it has been charged or dismounts the battery 10 in order to charge it, the battery can be mounted and dismounted easily by being slid, without the housing 2 being opened.

In addition, the battery mount part 8 is disposed on the rear end part of the housing 2, and the guide grooves 78 extend in the up down direction. Thereby, the user can, while supporting the housing 2 (the handle part 6) with one hand, mount and dismount, by sliding, the battery 10 onto and from an end part of the housing 2 with the other hand, and therefore the battery 10 is much more easily mountable and dismountable.

Furthermore, the battery 10, which is mountable on the battery mount part 8, is provided, and the battery 10 has the rails 69, which enter the guide grooves 78. Thereby, the sliding of the battery 10 is guided by the battery mount part 8, and therefore the battery 10 mounts and dismounts, by sliding, much more easily.

Furthermore, the fixed blade retaining part 172, which holds the fixed blade 28, and the base 30, which has the base main body part 170 that holds the fixed blade retaining part 172, are provided; the rotary blade 26 is driven about the central axis M2, which is oriented in the left right direction; the fixed blade 28 is disposed adjacent to the right surface of the rotary blade 26; and the front end part F1 of the base main body part 170 and the tab lower end part R1 overlap, in order, the fixed blade retaining part 172 (the front end part F2) and the fixed blade 28 (the rear lower part R2) in the left right direction. Thereby, by virtue of the fixed blade 28 being pressed in the left right direction against the workpiece, the fixed blade 28 is permitted to move slightly to ensure satisfactory cutting quality and to protect the fixed blade 28. In addition, even if the base main body part 170 attempts to move greatly outward in the left right direction to the extent that the fixed blade 28, the fixed blade retaining part 172, or the like overtakes the base main body part 170, the movement of the base main body part 170 outward from the fixed blade 28 and the fixed blade retaining part 172 is hindered by the overlapping portion. Accordingly, extreme movement of the fixed blade 28 in the left right direction is prevented, and the cutting of the workpiece by the multi-cutter 1 is more stabilized. In addition, the fixed blade 28 is prevented from overtaking the rotary blade 26, the base main body part 170, and the like and moving to the outer side (the left side) thereof, and thereby the cutting of the workpiece by the multi-cutter 1 is more stabilized.

Furthermore, the fixed blade retaining part 172, which holds the fixed blade 28, and the base 30, which comprises the base main body part 170 that holds the fixed blade retaining part 172, are provided; the rotary blade 26 is driven about the central axis M2, which is oriented in the left right direction; the fixed blade 28 is disposed adjacent to the left surface or the right surface of the rotary blade 26; and the base main body part 170 overlaps the fixed blade 28 in the up down direction. Thereby, by virtue of the fixed blade 28 being pressed in the up down direction when a workpiece having a comparatively large wall thickness is being cut, a slight movement of the fixed blade 28 is permitted to ensure sufficient cutting quality, to protect the fixed blade 28, and to handle a variety of workpieces, while at the same time, even if the fixed blade 28 attempts to move to the left side and overtake the rotary blade 26, the base main body part 170, or the like or even if the fixed blade 28 attempts to change from a substantially vertical attitude to a tilted attitude such that it falls in the left right direction (in particular, the direction in which the upper side becomes leftward with respect to a lower side of the fixed blade 28), the outward movement of the base main body part 170 in the up down direction of the fixed blade 28 and the fixed blade retaining part 172 is hindered by the overlapping portion, and by virtue of the base main body part 170 supporting the fixed blade 28 by contact, tilting of the fixed blade 28 is prevented. Accordingly, extreme movement of the fixed blade 28 in the up down direction, a tilted attitude of the fixed blade 28, and the like are prevented, and therefore the cutting of the workpiece by the multi-cutter 1 is more stabilized.

Furthermore, the blade cover 44, which is disposed outward of the rotary blade 26, is provided; the rotary blade 26 is driven about the central axis M2, which is oriented in the left right direction; the fixed blade 28 is disposed adjacent to the left surface or the right surface of the rotary blade 26; and a portion (the left surface, the ink line 192, or the like) of the blade cover 44 has a shape in which, the farther forward it goes, the more it goes toward the side (right side) having the fixed blade 28, viewed from the rotary blade 26. Thereby, if the user performs cutting using that portion of the blade cover 44 as a guide, leading away of the fixed blade 28 is prevented and cutting, in which the side having the fixed blade 28, viewed from the rotary blade 26, curves toward the opposite side (left side), is stabilized.

Furthermore, the fixed blade retaining part 172, which holds the fixed blade 28, and the base 30, which comprises the base main body part 170 that holds the fixed blade retaining part 172, are provided; the rotary blade 26 is driven about the central axis M2, which is oriented in the left right direction; the fixed blade 28 is disposed adjacent to the left surface or the right surface of the rotary blade 26; and a portion of the base 30 (the rear part of the base main body part 170 or the fixed blade retaining part 172) has a shape in which the farther forward it goes, the more it goes toward the side (right side) having the fixed blade 28, viewed from the rotary blade 26. Thereby, the workpiece is naturally guided in a cutting direction that prevents the leading away of the fixed blade 28 and stabilizes the cutting of a left curve.

In addition, the multi-cutter 1 comprises: the motor 11; the rotary blade 26, which is driven by the motor 11 about the central axis M2 that is oriented in the left right direction; the fixed blade 28, which is disposed adjacent to the right surface of the rotary blade 26; and the blade cover 44, which is disposed outward of the rotary blade 26. A portion (the left surface, the ink line 192, or the like) of the blade cover 44 has a shape in which the farther forward it goes, the more it goes toward the side (right side) having the fixed blade 28, viewed from the rotary blade 26. Thereby, if the user performs cutting using that portion of the blade cover 44 as a guide, then leading away of the fixed blade 28 is curtailed and thereby cutting, in which the side having the fixed blade 28, viewed from the rotary blade 26, curves to the opposite side (left side), is stabilized.

In addition, the rotary blade 26 is parallel to the motor shaft 20 of the motor 11. Thereby, in a multi-cutter 1 in which that portion of the blade cover 44 is somewhat tilted, the rotary blade 26, the motor 11 for driving the rotary blade 26, the motive power transmission mechanism between the motor 11 and the rotary blade 26, and the fixed blade 28 that opposes the rotary blade 26 are easy to arrange.

Furthermore, a portion of the blade cover 44 is the ink line 192, which both protrudes from other portions and whose color has been changed with respect to the other portions. Thereby, the ink line 192, which is a guide for preventing leading away of the fixed blade 28 and for stabilizing the cutting of a left curve, becomes readily visible.

In addition, by using multicolor integral molding, the ink line 192 is formed together with the other portions of the blade cover 44. Thereby, the blade cover 44 with the ink line 192 is easy to form, and the situation in which the ink line 192 dulls or disappears due to wear is prevented.

Furthermore, the multi-cutter 1 comprises: the motor 11; the rotary blade 26, which is driven by the motor 11 about the central axis M2 that is oriented in the left right direction; the fixed blade 28, which is disposed adjacent to the right surface of the rotary blade 26; and the base 30, which holds the fixed blade 28. A portion (the rear part of the base main body part 170 or the fixed blade retaining part 172) of the base 30 has a shape in which the farther forward it goes, the more it goes toward the side (right side) having the fixed blade 28, viewed from the rotary blade 26. Thereby, owing to that portion of the base 30, the workpiece is naturally guided in a cutting direction that prevents leading away of the fixed blade 28 and stabilizes the cutting of a left curve.

In addition, the multi-cutter 1 comprises: the motor 11; the rotary blade 26, which is driven by the motor 11; the fixed blade 28, which is disposed opposing the rotary blade 26; the housing 2 (the left housing 40, the right housing 42), which is halved and in which the motor 11 is held; and the blade cover 44, which is disposed outward of the rotary blade 26 and mounted on the housing 2. The blade cover 44 and the halved housing 2 are fixed by common fixing members (screws 190). Thereby, the part count of the multi-cutter 1 is reduced, the number of required fixed structures is reduced, space is saved to the extent of the omitted fixed structures, and thus the multi-cutter 1 becomes more compact.

Furthermore, the screw boss part 49 (the receiving part of the fixing member), through which the screw 190 passes, enters the screw boss hole 182 (the through hole of the receiving part of the fixing member) provided on the base 30. Thereby, the fixed structure of the base 30 also can be further standardized, the part count can be further reduced, and thus the multi-cutter 1 becomes much more compact.

In addition, the multi-cutter 1 comprises: the motor 11; the gear assembly 12, which is connected to the motor 11; the rotary blade 26, which is driven by the gear assembly 12; the fixed blade 28, which is disposed opposing the rotary blade 26; and the housing 2, in which the motor 11 and the gear assembly 12 are held. The gear assembly 12 comprises the gear case 22. Because the internal structure of the gear assembly 12 (the planetary gear mechanism 130, the spindle 132, the first bevel gear 134, the second bevel gear 136, the base end part of the output shaft 24, etc.) is doubly protected (double structure) by the housing 2 and the gear case 22, hindrance of operation of the multi-cutter 1 owing to the ingress of dust or the like into the gear assembly 12 is prevented. Moreover, leakage of the lubricant, such as grease, inside the gear assembly 12 to the exterior is prevented.

Furthermore, the housing 2 is halved (the left housing 40, the right housing 42) and has divided surfaces in a direction that crosses the divided surfaces of the housing 2. Thereby, the housing 2, the gear case 22, and the like each have a divided structure, and therefore assembly, maintenance, and the like is easy. In addition, even if by chance grease or the like inside the gear case 22 should flow out (leak) between the divided surfaces, the gear case 22 is disposed such that the direction of its divided surfaces differs from that of the divided surfaces of the housing 2. Therefore, grease or the like tends not to further flow out from the housing 2. Moreover, even if dust or the like were to penetrate between the divided surfaces of the housing 2, it will tend not to penetrate farther into the gear case 22.

In addition, the multi-cutter 1 comprises: the motor 11; the rotary blade 26, which is driven by the motor 11; the fixed blade 28, which is disposed opposing the rotary blade 26; the housing 2, in which the motor 11 is held; the main switch 34, which is disposed in the housing 2 such that it is capable of being pressed in by the switch lever 80; and the lock OFF lever 35 (locking member), which is capable of locking or unlocking the pressing in of the switch lever 80. The lock OFF lever 35 is adjacent to the motor 11 and comprises the recessed part 104, which circumvents the motor 11. Thus, when a sufficiently large operation portion (the left surface or the right surface of the lock OFF lever main body part 100) of the lock OFF lever 35 is secured, the lock OFF lever 35 is disposed such that it is close to the motor 11 just as much as is the recessed part 104. Therefore, in such a multi-cutter 1, the ease of operation of the lock OFF lever 35 is ensured, and the periphery (the housing 2, the main body part 4, the handle part 6, etc.) of the motor 11 is more compact.

It is noted that the embodiments of the present disclosure are not limited to the above-mentioned first embodiment and the modified examples thereof, and, for example, the first embodiment includes the following kinds of modified examples as appropriate.

The battery may be configured such that it is mounted on the battery mount part from above to below and is dismounted by being slid upward.

The battery mount part may be disposed on other than the rear end part of the housing. The various terminals, which protrude forward, and the front surface of the terminal, which has the guide groove that is recessed rearward, may be configured such that they are exposed, and the battery may be configured such that it is mounted and dismounted by being slid rearward along the slits, the rail side surfaces, or the like.

The protruding parts (terminals), guide grooves, or the like may be provided on the battery, and the slits, the rails, or the like may be provided on the battery mount part. The protruding parts, the slits, the rails, or the guide grooves may be omitted.

The securing of the battery (battery pack, battery cartridge) to the battery mount part is not limited to the battery tab entering the hollow part, and the latching part, such as the hook part, which is disposed on the battery mount part side, may latch to the latched part, such as the hollow part, disposed on the battery side.

The electrical connections between the terminals on the battery side and the terminals on the battery mount part side are not limited to the embodiments in which the plate shaped terminals enter the terminals provided inside the slits and may be configured such that columnar shaped projections make contact with contact parts or are received by receiving parts, or such that latching parts, such as hook parts, and latched parts, such as hole parts, engage.

The left surface of the blade cover, the front part of the fixed blade retaining part of the base, and the like do not have to be tilted with respect to the urasuki surface of the rotary blade, and the entire blade cover, the entire base, and the like may be tilted with respect to the urasuki surface of the rotary blade. The ink line may be formed by printing, coating, or the like.

With regard to maintenance, the main switch main body part, the switch lever, or the like may be disposed on the rear part of the handle part, the switch lever may be configured such that it rocks about a shaft provided on the front end part, and the entire switch lever main body part may be capable of being operated such that it is pushed-in the same amount.

With regard to the lock OFF lever, instead of unlocking by the user maintaining the lock OFF lever at the position of the end portion of the range of motion, a lock OFF lever may be used that is latched by a latching member, such as a tab, at the locked position and the lock released position. In addition, the lock OFF lever may be omitted.

With regard to the planetary gear mechanism, instead of the pins being inserted into the carrier or in combination therewith, the pins may be inserted in holes of projections, tabs may be latched together, or the like. In addition, the holes into which the pins are inserted may be configured as bottomed holes. Furthermore, the internal gear may be divided in stages.

The planetary gear mechanism may be modified to be some other speed reducing mechanism or may be omitted.

The spindle between the motor shaft and the output shaft may be omitted, a plurality of the spindles may be provided, or a separate intermediate shaft may be provided.

As the battery (battery pack, battery cartridge), any combination of lithium ion batteries, such as 10.8 V, 18 V (max. 20 V), 18 V, 25.2 V, 28 V, 36 V, etc., may be used, a lithium ion battery pack or cartridge having a voltage that is less than 10.8 V or exceeds 36 V may be used, and a battery of some other type may be used.

The number of sections of the housing, the number of planet gears installed, and the like may be increased or decreased; air suction air-exhaust ports may be further provided; the screw locks may be configured as pin locks, rivet locks, latching part locks, or the like; and the number, arrangement, material, size, type, or the like of the various members, portions, and the like may be modified as appropriate.

The fixed blade may be disposed on the left side of the rotary blade or may be disposed adjacent to the upper part of the rotary blade.

Furthermore, the present invention can be applied to a multi-cutter that is connected to a commercial power supply, to other types of cutting tools, etc.

Second Embodiment

Figure 19A:
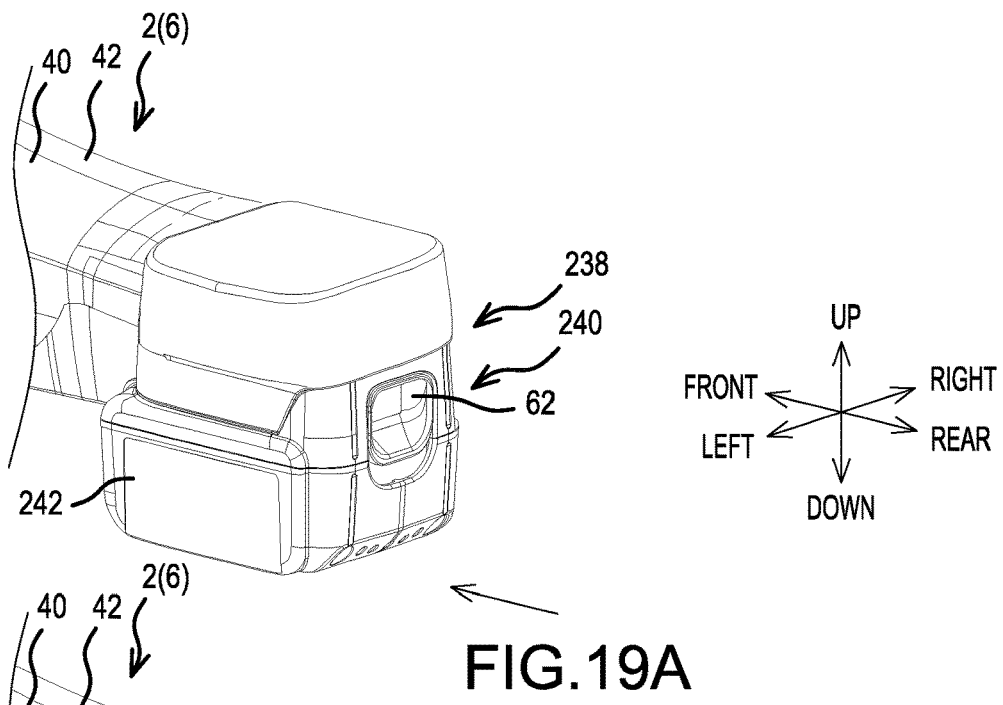
FIGS. 19A, B, and C are oblique views of a rear part according to the second embodiment, a third embodiment, and a fourth embodiment, respectively, of the present teachings.

FIG. 19A is an oblique view of the rear part of a multi-cutter according to a second embodiment of the present disclosure.

The multi-cutter of the second embodiment is configured the same as the multi-cutter 1 of the first embodiment, except for the configuration of the rear portion. Below, structural elements that are the same are assigned the same symbols as in the first embodiment, and explanations thereof are omitted as appropriate.

A battery mount part 238 of the multi-cutter of the second embodiment is disposed such that the terminal 36 extends to the front, rear, left, and right. The plus terminal 70, the minus terminal 72, and the communication terminal 74 of the terminal 36 extend in the front rear direction and protrude downward from the lower surface.

Figure 18B:
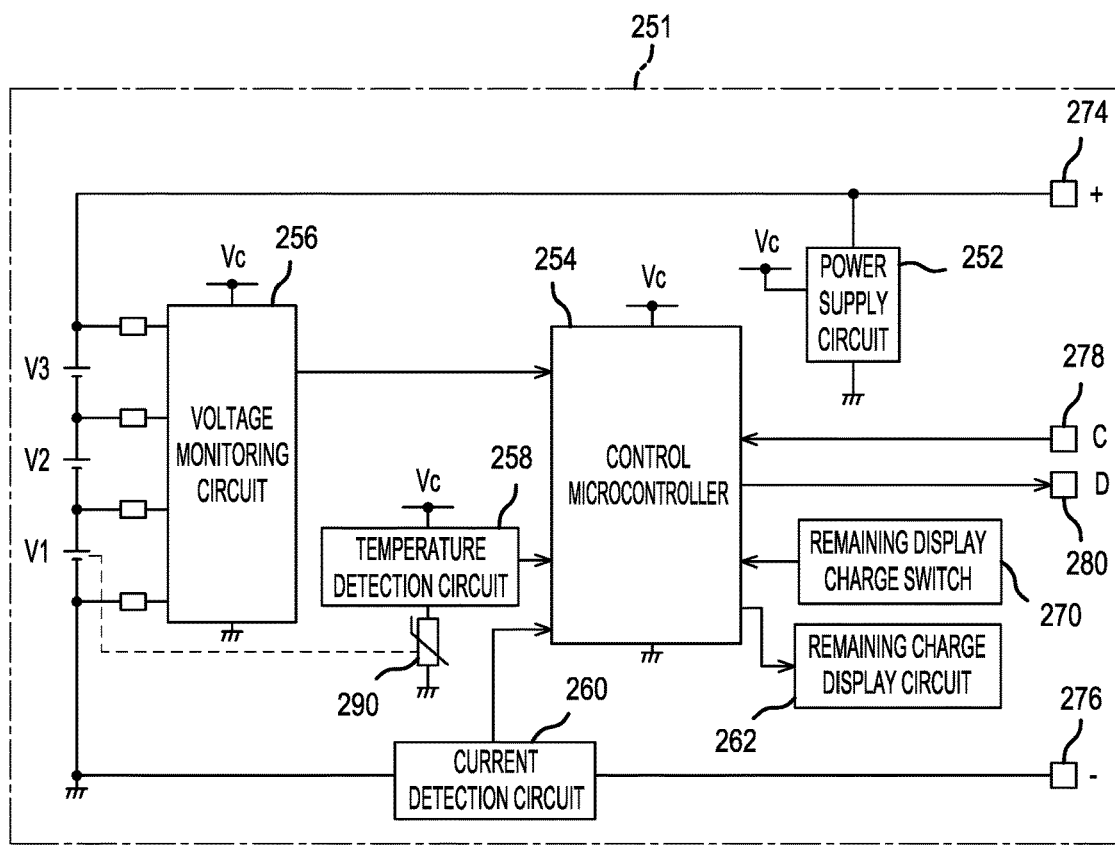

A battery 240, which is mounted on the battery mount part 238, is an 18 V lithium ion battery (pack), and three cells, which are not shown other than in FIG. 18B, are contained inside the battery case 242, which is made of resin. The cells each have a circular columnar shape that is elongated in the axial direction and that is oriented in the left right direction. The battery 240 is larger than the battery 10 of the first embodiment and comprises the battery lever 62 on its rear surface.

The battery 240 comprises, on its upper surface, the plus terminal slit 64, the minus terminal slit 66, and the communication terminal slit 68, which each extend in the front rear direction, and furthermore, on its upper surface, has the rails 69, which are disposed on the left and right thereof, extend in the front rear direction, and protrude upward.

The battery 240 is mounted, by being slid forward, on the battery mount part 238. In addition, the battery 240 mounted on the battery mount part 238 is dismounted by being slid rearward in the state in which the battery lever 62 has been manipulated (pushed) downward.

A control circuit 251 of the battery 240 is shown in FIG. 18B.

The control circuit 251 of the battery 240 comprises a power supply circuit 252, a control microcontroller 254, a voltage monitoring circuit 256, a temperature detection circuit 258, a current detection circuit 260, a remaining charge display circuit 262, a remaining charge display switch 270, a power supply plus terminal 274, a power supply minus terminal 276, battery side communication terminals 278, 280, and a thermistor 290 similar to the thermistor 208.

The battery 240 has, on a surface portion (front surface part) thereof the same as in the battery 10 of the first embodiment, the remaining charge display switch 270, the remaining charge display circuit 262, and the remaining charge indication part (here, four light emitting devices (LEDs) that are shown in FIG. 18A). In addition, the power supply plus terminal 274 is provided in the plus terminal slit 64 of the battery 240, the power supply minus terminal 276 is provided in the minus terminal slit 66, and the battery side communication terminals 278, 280 (not shown other than in FIG. 18(b)) are provided in communication terminal slit 68. Furthermore, the battery 240 comprises three battery cells V1-V3.

The plus terminal 70 of the battery mount part 8 contacts and is electrically connected to the power supply plus terminal 274 of the battery 240 in the mounted state; likewise, the minus terminal 72 is connected to the power supply minus terminal 276, and the communication terminal 74 is connected to the battery side communication terminals 278, 280.

In the power supply circuit 252, when the battery voltage is input, that battery voltage is stepped down to a prescribed control voltage Vc and output. The control voltage Vc is used as the operating power supply for each part, such as the control microcontroller 254.

The control microcontroller 254 is a microcomputer that comprises a CPU, ROM, RAM, an interface, etc.

The voltage monitoring circuit 256 detects the voltage of each of the battery cells V1-V3 and sends this to the control microcontroller 254.

The temperature detection circuit 258 detects the temperature of the battery 240 based on the resistance value of the thermistor 290 and sends this to the control microcontroller 254. The thermistor 290 is disposed adjacent to the battery cell V1 and is configured to detect the temperature of the battery cell V1 but may be disposed on some other portion or may be configured to detect the temperature of some other portion.

The current detection circuit 260 detects the conducting current and sends this to the control microcontroller 254.

When the control microcontroller 254 receives an ON signal from the remaining charge display switch 270, the control microcontroller 254 calculates the remaining charge of the battery 240 in accordance with the voltages of the battery cells V1-V3 sent from the voltage monitoring circuit 256 and causes the remaining charge display circuit 262 (the remaining charge indication part) to display this, the same as in the battery 240.

It is noted that the shape, number, type, arrangement, or the like with regard to the battery cells, the terminals, and the like are not limited to those in the first embodiment and the second embodiment and can be modified as appropriate. In addition, the circuit configurations of the control circuits 201, 251 of the batteries 10, 240 also can be variously modified, such as by increasing or decreasing the number of circuits, devices, or the like or by newly adding a device, a circuit, or the like.

The multi-cutter of the second embodiment comprises: the motor 11; the rotary blade 26, which is driven by the motor 11; the fixed blade 28, which is disposed opposing the rotary blade 26; the housing 2, in which the motor 11 is held; and the battery mount part 238, which is formed on the housing 2 and on which the battery 240 for a power tool is mountable. The battery mount part 238 has the guide grooves 78, which guide the battery 240. Thereby, when the user mounts the battery 240 after charging or dismounts the battery 240 in order to charge it, the user can easily mount and dismount the battery 240 by sliding, without opening the housing 2, etc.

In addition, the battery mount part 238 is disposed on the rear end part of the housing 2, and the guide grooves 78 extend in the front rear direction. Thereby, the user can, while supporting the housing 2 (the handle part 6) with one hand, mount and dismount the battery 240 onto and from the end part of the housing 2 by sliding it with the other hand, and therefore the battery 240 can be mounted and dismounted much more easily.

Furthermore, the battery 240, which is mountable on the battery mount part 238, is provided, and the battery 240 has the rails 69, which enter the guide grooves 78. Thereby, the sliding of the battery 240 is guided by the battery mount part 238, and therefore the battery 240 mounts and dismounts, by sliding, much more easily.

It is noted that the above-described second embodiment includes, as appropriate, the same modified examples as in the first embodiment.

In particular, the battery may be upward and the battery mount part may be downward.

In addition, when the battery is being mounted, it may be slid rearward; and when the battery is being dismounted, it may be slid forward.

Third Embodiment

Figure 19B:
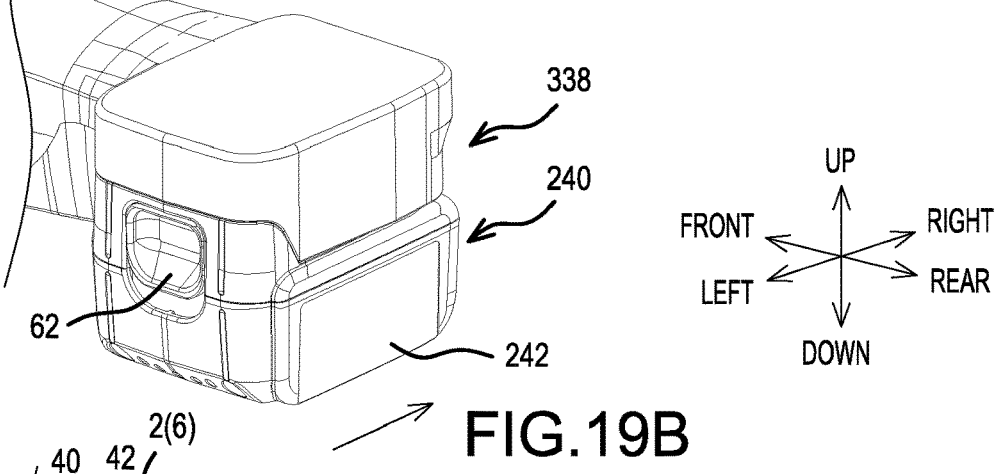

FIG. 19B is an oblique view of the rear part of the multi-cutter according to a third embodiment of the present disclosure.

The multi-cutter of the third embodiment is configured the same as the multi-cutter of the second embodiment, except for the configuration of the rear portion. Below, structural elements that are the same are assigned the same symbols as in the second embodiment, and explanations thereof are omitted as appropriate.

A battery mount part 338 of the multi-cutter of the third embodiment is disposed such that the terminal 36 extends to the front, rear, left, and right. The plus terminal 70, the minus terminal 72, and the communication terminal 74 of the terminal 36 extend in the left right direction and protrude downward from the lower surface.

The cells of the battery 240, when mounted on the battery mount part 338, are oriented in the front rear direction. The battery 240 comprises, on its left surface, the battery lever 62.

The battery 240 comprises, on its upper surface, the plus terminal slit 64, the minus terminal slit 66, and the communication terminal slit 68, which each extend in the left right direction, and furthermore has, on its upper surface, the rails 69, which are disposed to the front and to the rear thereof, extend in the left right direction, and protrude upward.

The battery 240 is mounted, by being slid rightward, on the battery mount part 338. In addition, the battery 240 mounted on the battery mount part 338 is dismounted by being slid leftward in the state in which the battery lever 62 has been manipulated downward.

The multi-cutter of the third embodiment comprises: the motor 11; the rotary blade 26, which is driven by the motor 11; the fixed blade 28, which is disposed opposing the rotary blade 26; the housing 2, in which the motor 11 is held; and the battery mount part 338, which is formed on the housing 2 and on which the battery 240 for a power tool is mountable. The battery mount part 338 has the guide grooves 78, which guide the battery 240. Thereby, the user can easily mount and dismount the battery 240 by sliding it with respect to the battery mount part 338.

In addition, the battery mount part 338 is disposed on the rear end part of the housing 2 and the guide grooves 78 extend in the left right direction. Thereby, the user can, while supporting the housing 2 (the handle part 6) with one hand, mount and dismount, by sliding, the battery 240 onto and from the battery mount part 338 of the end part of the housing 2 with the other hand, and therefore the battery 240 can be mounted and dismounted much more easily.

Furthermore, the battery 240, which is mountable on the battery mount part 338, is provided, and the battery 240 has the rails 69, which enter the guide grooves 78. Thereby, the sliding of the battery 240 is guided by the battery mount part 338, and therefore the battery 240 mounts and dismounts much more easily.

It is noted that the above-described third embodiment includes, as appropriate, the same modified examples as in the first embodiment and the second embodiment.

For example, the battery may be slid leftward when being mounted or may be slid rightward when being dismounted.

Fourth Embodiment

Figure 19C:
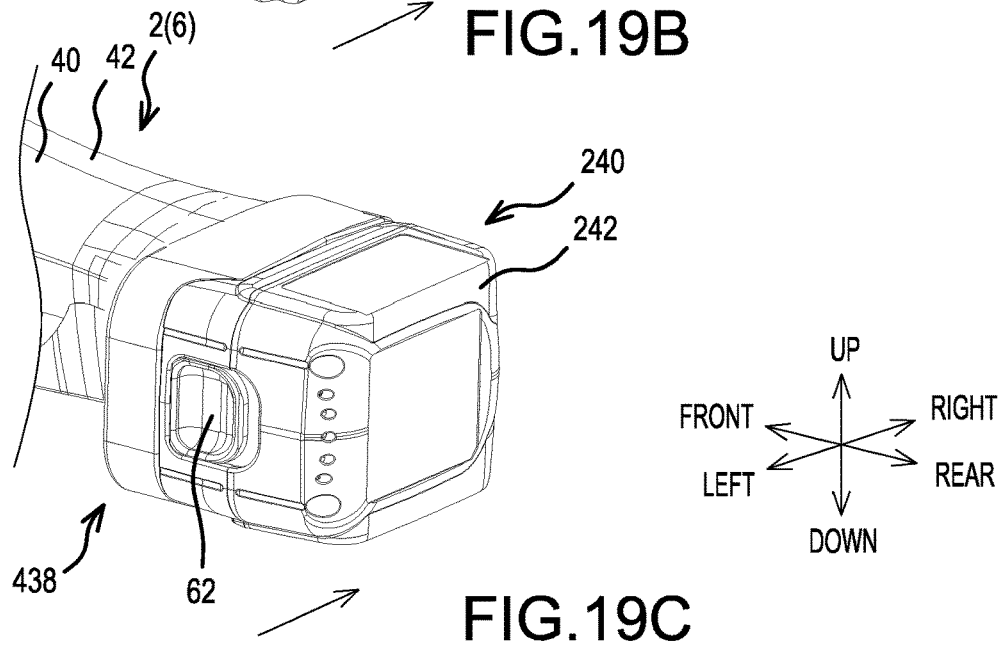

FIG. 19C is an oblique view of the rear part of the multi-cutter according to a fourth embodiment of the present disclosure.

The multi-cutter of the fourth embodiment is configured the same as the multi-cutter of the second embodiment, except for the configuration of the rear portion. Below, structural elements that are the same are assigned the same symbols as in the second embodiment, and explanations thereof are omitted as appropriate.

A battery mount part 438 of the multi-cutter of the fourth embodiment is disposed such that the terminal 36 extends up, down, left, and right. The plus terminal 70, the minus terminal 72, and the communication terminal 74 of the terminal 36 extend in the left right direction and protrude rearward from the rear surface.

The cells of the battery 240 mounted on the battery mount part 438 are oriented in the up down direction. The battery 240 comprises, on its left surface, the battery lever 62.

The battery 240 comprises, on its front surface, the plus terminal slit 64, the minus terminal slit 66, and the communication terminal slit 68, which each extend in the left right direction, and further has, on its front surface, the rails 69, which are disposed above and below thereof, extend in the left right direction and protrude forward.

The battery 240 is mounted, by being slid rightward, on the battery mount part 438. In addition, the battery 240 mounted on the battery mount part 438 is dismounted by being slid leftward in the state in which the battery lever 62 has been manipulated downward.

The multi-cutter of the fourth embodiment comprises: the motor 11; the rotary blade 26, which is driven by the motor 11; the fixed blade 28, which is disposed opposing the rotary blade 26; the housing 2, in which the motor 11 is held; and the battery mount part 438, which is formed on the housing 2 and on which the battery 240 for a power tool is mountable. The battery mount part 438 has the guide grooves 78, which guide the battery 240. Thereby, the user can easily mount and dismount the battery 240 by sliding it with respect to the battery mount part 438.

In addition, the battery mount part 438 is disposed on the rear end part of the housing 2, and the guide grooves 78 extend in the left right direction. Thereby, the user can, while supporting the housing 2 with one hand, mount and dismount, by sliding, the battery 240 onto and from the battery mount part 438 of the end part of the housing 2 with the other hand, and therefore the battery 240 can be much more easily mounted and dismounted.

Furthermore, the battery 240, which is mountable on the battery mount part 438, is provided, and the battery 240 has the rails 69, which enter the guide grooves 78. Thereby, the sliding of the battery 240 is guided by the battery mount part 438, and therefore the battery 240 mounts and dismounts, by sliding, much more easily.

It is noted that the above-described fourth embodiment includes, as appropriate, the same modified examples as the first embodiment to the third embodiment.

For example, the battery may be slid leftward when being mounted and may be slid rightward when being dismounted.

In addition, the battery may be disposed forward and the battery mount part may be disposed rearward.

Fifth Embodiment

The multi-cutter of the fifth embodiment is shown in FIGS. 20A-F and is configured the same as the multi-cutter 1 of the first embodiment, except for the configuration of the fixed blade. Below, structural elements that are the same are assigned the same symbols as in the first embodiment, and explanations thereof are omitted as appropriate.

Figure 20A:
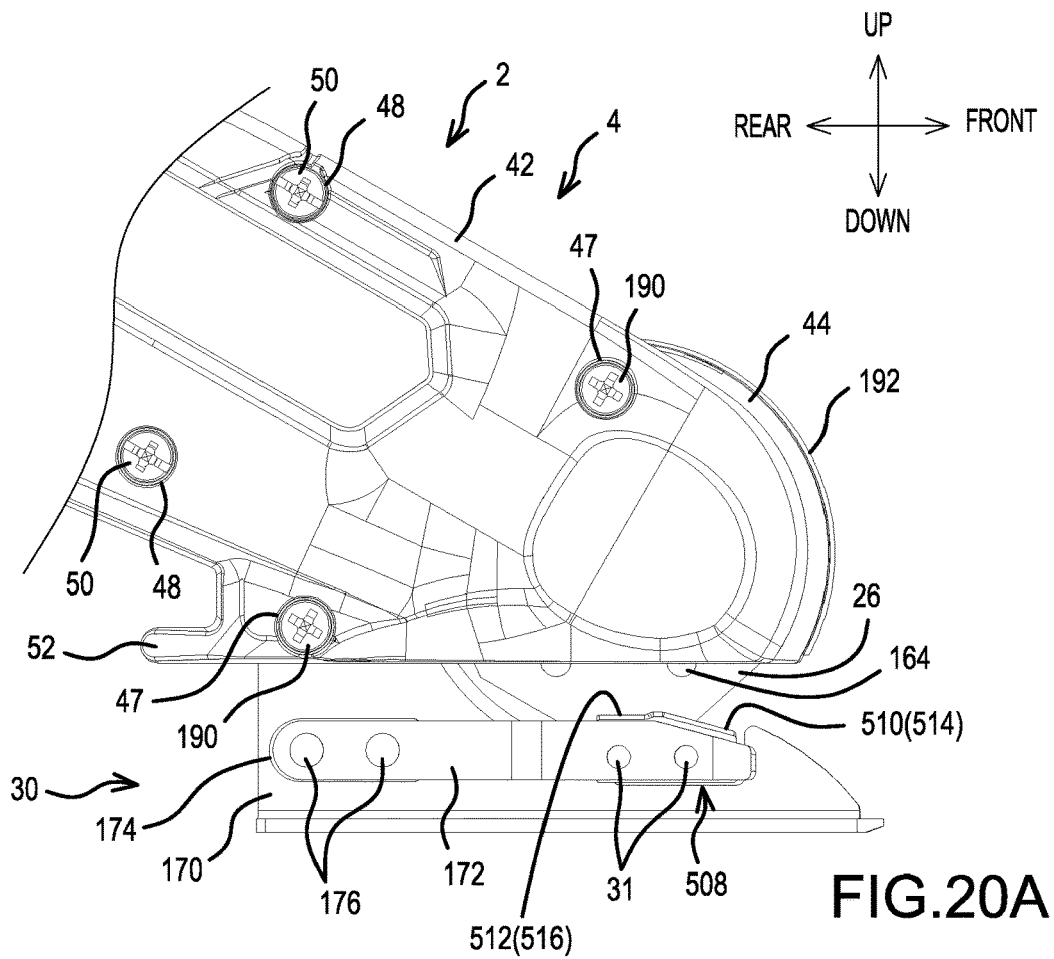
FIG. 20A is a right view of the front part of the multi-cutter according to a fifth embodiment of the present disclosure.
Figure 20B:
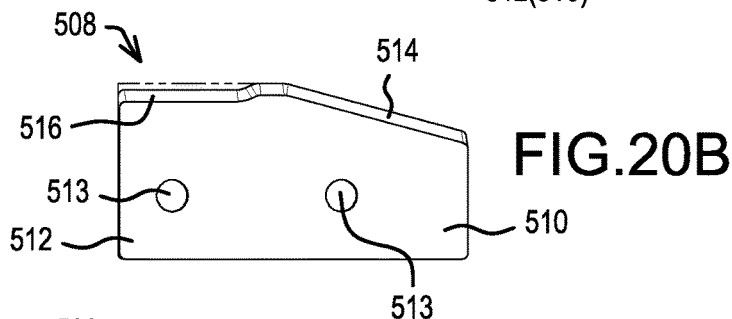
FIG. 20B is a right view of a fixed blade.
Figure 20C:
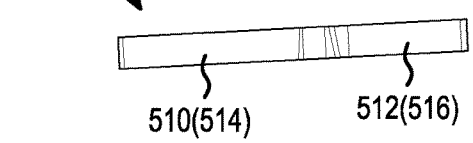
FIG. 20C is a top view of the same.
Figure 20E:
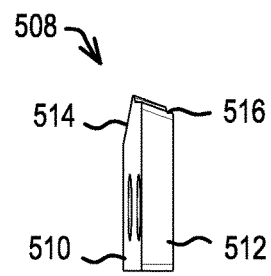
FIG. 20D is a left view of the same.
FIG. 20F is a rear view of the same.
Figure 20D:
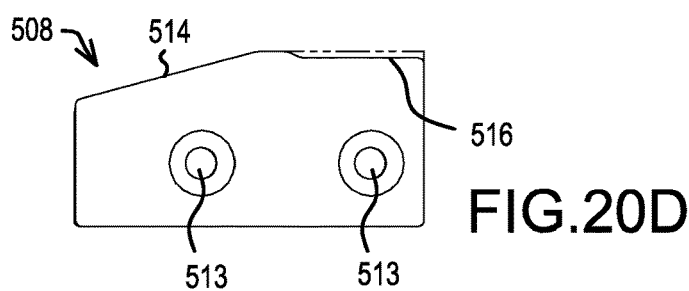

The fixed blade 508 on the multi-cutter of the fifth embodiment comprises: a fixed blade front part 510 and a fixed blade rear part 512 having a height (dimension in the up down direction) that is smaller than the maximum height of the fixed blade front part 510, as can be seen in FIGS. 20A and 20D. Rivet holes 513 are respectively formed in the center part of the fixed blade front part 510 and the center part of the fixed blade rear part 512.

An upper side of the fixed blade front part 510 is a tilted side, in which the more rearward it goes, the higher it becomes, and a front blade 514, which is lower in the front, is attached thereto. The lower side of the fixed blade front part 510 and the lower side of the fixed blade rear part 512 are continuous and extend in the front rear direction; the maximum height portion of the fixed blade front part 510 is the portion from the rear end part of the front blade 514 and downward thereof. It is noted that, in greater detail, the maximum height portion of the fixed blade front part 510 extends slightly in the front rear direction, and the blade is attached also to that portion.

The upper side of the fixed blade rear part 512 extends in the front rear direction, and a rear blade 516 is attached thereto. The height of the fixed blade rear part 512 across its entirety is lower than the maximum height of the fixed blade front part 510. Thereby, the height of the rear blade 516 is lower than the maximum height of the front blade 514. It is noted that, in greater detail, a tilted side, which is short and lower in the rear, is formed between a rear end of the maximum height portion of the fixed blade front part 510 and a portion of the rear blade 516 in the front rear direction, and a blade is attached also to that portion. It is noted that a portion or all of the blade of each portion of the fixed blade 508 may be omitted, as long as a blade is attached at some other portion.

The fixed blade 508 has a shape in which the rear blade 516 retreats downward with respect to the fixed blade (the fixed blade 28 of the first embodiment) having the rear blade (refer to the chain double dashed line in FIG. 20B, D) that extends rearward, as is, from the rear end part of the front blade 514.

Like the fixed blade 28 of the first embodiment, the fixed blade 508 is mounted on the base main body part 170 via the front and rear rivets 31, the fixed blade retaining part 172, the spacer 174, and the front and rear rivet 176.

In the multi-cutter of the fifth embodiment, the fixed blade 508 comprises the front blade 514 and the rear blade 516, and the height of the rear blade 516 is lower than the maximum height of the front blade 514. Thereby, with regard to the fixed blade 508, even though the height of the rear blade is maintained at the maximum height of the front blade as in the fixed blade 28, the front rear length is maintained long and, owing to the retreating of the rear blade 516, a certain amount of up down movement, undulating, or the like in the workpiece is permitted; therefore the workpiece is much more easily guided rearward.

It is noted that the above-described fifth embodiment includes, as appropriate, the same modified examples as the first embodiment to the fourth embodiment.

In addition, in side view, the front blade may be a peak type that has one or a plurality of vertices, and the rear blade may be a similar peak type, may be lower in the rear, or the like.

Sixth Embodiment

FIG. 17D is an end surface schematic diagram (lower part of line E-E shown in FIG. 3), corresponding to FIG. 17C, of the multi-cutter according to a sixth embodiment of the present disclosure.

The multi-cutter of the sixth embodiment is configured the same as the multi-cutter 1 of the first embodiment, except for the arrangement of the fixed blade 28 (the amount of overlap with the base main body part 170 in the up down direction). Below, structural elements that are the same are assigned the same symbols as in the first embodiment, and explanations thereof are omitted as appropriate.

The amount by which the fixed blade 28 in the present embodiment overlaps the base main body part 170 in the up down direction is to the extent shown in FIG. 17D, that is, in the longitudinal cross section (E-E) of the contact point between the rotary blade 26 and the fixed blade 28, to the extent that the fixed blade 28 is located directly above the base main body part 170. In that longitudinal cross section, the base main body part 170 overlaps, in the up down direction, the entire fixed blade 28.

The left surface of the front part of the fixed blade 28 (the portion forward of that longitudinal cross section) is leftward of the left surface of the front end part F1 of the base main body part 170, and the front part of the fixed blade 28 protrudes leftward from the base main body part 170.

The front end part F2 of the fixed blade retaining part 172 is located on the right side of the front end part F1 of the base main body part 170.

In the present embodiment, there is no spacing between the front end part F1 of the base main body part 170 and the front end part F2 of the fixed blade retaining part 172. Furthermore, there is no spacing also between the tab lower end part R1 of the base main body part 170 and the rear lower part R2 of the fixed blade 28. In addition, the left side of the fixed blade retaining part 172, the left side of the fixed blade 28, etc. contact or are supported by the base main body part 170.

In the multi-cutter of the present embodiment, the base main body part 170 overlaps the entire fixed blade 28 in the up down direction of the contact point between the rotary blade 26 and the fixed blade 28. Thereby, that contact point, which is the cutting point, is predominantly supported by the overlapping portion in the up down direction, and therefore the cutting of the workpiece by the multi-cutter 1 is stabilized.

In addition, from before the workpiece is received, the left side of the fixed blade retaining part 172, the left side of the fixed blade 28, and the like contact or are supported by the base main body part 170, and therefore shaking of the fixed blade 28 during cutting is much more suppressed.

It is noted that the above-described sixth embodiment includes, as appropriate, the same modified examples as the first embodiment to the fifth embodiment.

In particular, the front part of the fixed blade does not have to protrude leftward from the base main body part. In addition, the fixed blade may be configured such that its entirety is mounted, in a longitudinal cross section of the part that contacts the rotary blade, on the base main body part, which has a wall thickness thicker than the wall thickness of the fixed blade.

EXPLANATION OF THE REFERENCE NUMBERS

1 Multi-cutter (cutting tool)
2 Housing
8, 238, 338, 438 Battery mount part
10, 240 Battery
11 Motor
26 Rotary blade
28, 508 Fixed blade
30 Base
44 Blade cover
64 Plus terminal slit
66 Minus terminal slit
68 Communication terminal slit
69 Rail
70 Plus terminal (protruding part)
72 Minus terminal (protruding part)
74 Communication terminal (protruding part)
78 Guide groove
170 Base main body part
172 Fixed blade retaining part
192 Ink line (mark)

F1 front end part (of the base main body part) (overlapping portion in the left right direction)
F2 front end part (of the fixed blade retaining part) (overlapping portion in the left right direction)
R1 rear part front edge (of the base main body part) (overlapping portion in the left right direction)
R2 front part rear edge (of the fixed blade retaining part) (overlapping portion in the left right direction)

The invention claimed is:

1. A cutting tool comprising:
a housing;
a motor located in the housing;
a rotary blade mounted on a rotary shaft configured to be driven by the motor, the rotary shaft being oriented in a left-right direction;
a base body part supported by the housing, the base body part including a bottom member and a wall extending upwardly from the bottom member,
a fixed blade holding part on the base body part,
a fixed blade mounted on the fixed blade holding part and opposing the rotary blade; and
a battery mount part, which is formed on the housing and on which a battery for a power tool is mountable;
wherein:
the battery mount part has a rail configured to guide the battery,
at least a portion of the fixed blade is located directly above the wall,
the rotary blade contacts the fixed blade at a location directly above the wall, and
a rear portion of the fixed blade overlaps the wall when viewed in the left-right direction.

2. The cutting tool according to claim 1, wherein:
the battery mount part is disposed on a rear end part of the housing; and
the battery mounting direction is an up down direction, a front rear direction, or the left-right direction.

3. The cutting tool according to claim 1, further comprising:
a gear assembly, which is connected to the motor and held in the housing;
wherein the gear assembly comprises a gear case.

4. The cutting tool according to claim 3, wherein:
the housing comprises a first housing half connected to a second housing half at a housing dividing plane;
the gear case comprises a first case half connected to a second case half at a case dividing plane; and
the housing dividing plane intersects the case dividing plane.

5. The cutting tool according to claim 3, wherein a blade cover includes a mark that is raised relative to other portions of the blade cover or has a color different than a color of the other portions of the blade cover.

6. The cutting tool according to claim 1, wherein:
the fixed blade holding part is located directly above the bottom member.

7. The cutting tool according to claim 6, wherein the rotary blade rotates in a plane that is parallel to a motor shaft of the motor.

8. The cutting tool according to claim 7, wherein a portion of a blade cover is a straight line mark that protrudes relative to other portions of the blade cover and/or has a different color than the other portions of the blade cover, the line mark forming an angle with the plane of the rotary blade in the range of 1-5°.

9. The cutting tool according to claim 1, wherein the fixed blade holding part overlaps the base body part when viewed in the left-right direction.

10. The cutting tool according to claim 9, wherein the fixed blade holding part extends in a front-rear direction, the bottom member extends in the front-rear direction and a front end portion of the fixed blade holding part overlaps the base body part when viewed in the left-right direction.

11. The cutting tool according to claim 1, wherein a first portion of the fixed blade holding part is bent relative to a second portion of the fixed blade holding part and wherein the first portion of the fixed blade holding part is angled toward a plane of the wall.

12. The cutting tool according to claim 1, wherein in a cross section at a contact point of the rotary blade with the fixed blade, the entire fixed blade is located directly above the base body part.

13. The cutting tool according to claim 12, wherein a portion of the fixed blade forward of the contact point protrudes toward the rotary blade from the base body part.

14. The cutting tool according to claim 1, wherein at least a portion of the fixed blade is in contact with or supported by the wall.

15. The cutting tool according to claim 1, wherein the fixed blade also has a front portion and wherein a maximum height of the front portion is greater than a height of the rear portion.

16. The cutting tool according to claim 1, including a blade cover at least partially covering the rotary blade,
wherein an outer side of the blade cover is bounded by a vertical plane angled toward a longitudinal centerline of the cutting tool in a rear-front direction.

17. The cutting tool according to claim 1, wherein the fixed blade holding part has a rear portion parallel to the wall, a middle portion angled toward the rotary blade and a front portion that curves away from the rotary blade and the wall.

18. A cutting tool comprising:
a housing;
a motor located in the housing;
a rotary blade mounted on a rotary shaft configured to be driven by the motor, the rotary shaft being oriented in a left-right direction;
a base body part supported by the housing, the base body part including a bottom member extending in a front-rear direction and a wall extending upwardly from the bottom member;
a fixed blade holding part on the base body part and extending in the front-rear direction;
a fixed blade mounted on the fixed blade holding part and opposing the rotary blade; and
a battery mount part, which is formed on the housing and on which a battery for a power tool is mountable;
wherein:
the battery mount part has a guide rail configured to guide the battery, and
the fixed blade holding part has a rear portion parallel to the wall, a middle portion angled toward the rotary blade and a front portion that curves away from the rotary blade and the wall so that a front end portion of the fixed blade holding part overlaps the base body part when viewed in the left-right direction.

19. A cutting tool comprising:
a housing;
a motor located in the housing;

a rotary blade mounted on a rotary shaft configured to be driven by the motor, the rotary shaft being oriented in a left-right direction;
a blade cover partially covering the rotary blade;
a fixed blade disposed opposing the rotary blade;
a battery mount part, which is formed on the housing and on which a battery is mountable by sliding the battery in a battery mount direction;
a base body part supported by the housing, the base body part including a bottom member and a wall extending upwardly from the bottom member; and
a fixed blade holding part on the base body part;
wherein:
the battery mount part has a guide configured to guide the battery,
an outer side of the blade cover is bounded by a vertical plane angled toward a longitudinal centerline of the cutting tool in the rear-front direction, and
the fixed blade holding part has a rear portion parallel to the wall, a middle portion angled toward the rotary blade and a front portion that curves away from the rotary blade and the wall.

20. A cutting tool comprising:
a housing;
a motor located in the housing;
a rotary blade mounted on a rotary shaft configured to be driven by the motor, the rotary shaft being oriented in a left-right direction;
a base body part supported by the housing, the base body part including a bottom member and a wall extending upwardly from the bottom member;
a fixed blade holding part on the base body part;
a fixed blade mounted on the fixed blade holding part and opposing the rotary blade; and
a battery mount part, which is formed on the housing and on which a battery for a power tool is mountable;
wherein:
the battery mount part has a rail configured to guide the battery,
at least a portion of the fixed blade is located directly above the wall, and
the fixed blade holding part has a rear portion parallel to the wall, a middle portion angled toward the rotary blade and a front portion that curves away from the rotary blade and the wall.

21. A cutting tool comprising:
a housing;
a motor located in the housing;
a rotary blade mounted on a rotary shaft configured to be driven by the motor, the rotary shaft being oriented in a left-right direction;
a base body part supported by the housing, the base body part including a bottom member extending in a front-rear direction and a wall extending upwardly from the bottom member;
a fixed blade holding part on the base body part and extending in the front-rear direction;
a fixed blade mounted on the fixed blade holding part and opposing the rotary blade; and
a battery mount part, which is formed on the housing and on which a battery for a power tool is mountable;
wherein:
the battery mount part has a guide rail configured to guide the battery,
a front end portion of the fixed blade holding part overlaps the base body part when viewed in the left-right direction,
the rotary blade contacts the fixed blade at a location directly above the wall, and
a rear portion of the fixed blade overlaps the wall when viewed in the left-right direction.

22. A cutting tool comprising:
a housing;
a motor located in the housing;
a rotary blade mounted on a rotary shaft configured to be driven by the motor, the rotary shaft being oriented in a left-right direction;
a blade cover partially covering the rotary blade;
a fixed blade disposed opposing the rotary blade;
a battery mount part, which is formed on the housing and on which a battery is mountable by sliding the battery in a battery mount direction;
a base body part supported by the housing, the base body part including a bottom member and a wall extending upwardly from the bottom member; and
a fixed blade holding part on the base body part;
wherein:
the battery mount part has a guide configured to guide the battery,
an outer side of the blade cover is bounded by a vertical plane angled toward a longitudinal centerline of the cutting tool in the rear-front direction,
the rotary blade contacts the fixed blade at a location directly above the wall, and
a rear portion of the fixed blade overlaps the wall when viewed in the left-right direction.

* * * * *